(12) United States Patent
Wight et al.

(10) Patent No.: US 10,773,893 B2
(45) Date of Patent: Sep. 15, 2020

(54) SHUTTLE CONVEYOR SYSTEMS FOR USE WITH A PATTY FORMING MACHINE

(71) Applicant: Provisur Technologies, Inc., Chicago, IL (US)

(72) Inventors: E. William Wight, Roscoe, IL (US); Paul Taylor, Munster, IN (US); Christopher Moore, Homer Glen, IL (US)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 0 days.

(21) Appl. No.: 16/439,684

(22) Filed: Jun. 12, 2019

(65) Prior Publication Data

US 2019/0389661 A1 Dec. 26, 2019

Related U.S. Application Data

(60) Provisional application No. 62/690,140, filed on Jun. 26, 2018.

(51) Int. Cl.
*B65G 17/00* (2006.01)
*B65G 15/10* (2006.01)
(Continued)

(52) U.S. Cl.
CPC ........... *B65G 17/005* (2013.01); *B65G 15/10* (2013.01); *B65G 15/62* (2013.01); *B65G 47/088* (2013.01); *B65G 2201/0202* (2013.01)

(58) Field of Classification Search
CPC .... B65G 57/035; B65G 17/005; B65G 15/50; B65G 15/58; B65G 21/06; B65G 21/2036;
(Continued)

(56) References Cited

U.S. PATENT DOCUMENTS 3,061,984 A 11/1962 Mahaffy
3,685,251 A 8/1972 Mahaffy et al.
(Continued)

FOREIGN PATENT DOCUMENTS

EP 0 104 142 A2 3/1984
EP 0798242 A2 10/1997
(Continued)

OTHER PUBLICATIONS

International Search Report for corresponding International Application No. PCT/US19/36862 dated Sep. 3, 2019, 4 pages.
(Continued)

*Primary Examiner* — Mark A Deuble
(74) *Attorney, Agent, or Firm* — Klintworth & Rozenblat IP LLP

(57) ABSTRACT

A jump shuttle conveyor system is configured to receive formed food patties from a molding assembly of a patty forming machine. The system includes a lifting plate and belt assembly coupled to a frame which are configured to be indexed to different vertical positions relative to the frame. Formed food patties are received on a belt of the belt assembly thereon, and can be moved off of the belt onto a transfer shuttle conveyor system. An output conveyor system can be provided to receive the formed food patties.

20 Claims, 30 Drawing Sheets

(51) Int. Cl.
*B65G 15/62* (2006.01)
*B65G 47/08* (2006.01)

(58) Field of Classification Search
CPC ............ B65G 21/14; B65G 2201/0202; B65G 2207/26; B65G 15/10; B65G 15/105; B65G 15/62; B65G 47/082; B65G 47/084; B65G 47/088; A22C 17/0093; B65B 35/50
See application file for complete search history.

(56) References Cited

U.S. PATENT DOCUMENTS

| | | | |
|---|---|---|---|
| 3,818,300 | A | 6/1974 | Stroman |
| 4,137,604 | A | 2/1979 | Sandberg et al. |
| 4,193,167 | A | 3/1980 | Orlwoski et al. |
| 4,201,030 | A | 5/1980 | Mahaffy et al. |
| 4,236,855 | A | 12/1980 | Wagner et al. |
| 4,431,104 | A | 2/1984 | Orlowski et al. |
| 4,530,632 | A * | 7/1985 | Sela ............... A21C 9/086 198/493 |
| 4,685,364 | A | 8/1987 | Scheflow et al. |
| 4,709,535 | A | 12/1987 | Mahaffy et al. |
| 4,864,300 | A | 9/1989 | Zaremba |
| 4,891,568 | A | 1/1990 | Shibata et al. |
| 5,038,911 | A | 8/1991 | Doane et al. |
| 5,054,266 | A | 10/1991 | Mello et al. |
| 5,078,259 | A | 1/1992 | Honsberg |
| 5,303,141 | A | 4/1994 | Batchelder et al. |
| 5,310,064 | A | 5/1994 | Neff et al. |
| 5,638,659 | A | 6/1997 | Moncreif et al. |
| 5,730,650 | A | 3/1998 | Soper |
| 5,761,883 | A | 6/1998 | Pruett et al. |
| 5,810,149 | A | 9/1998 | Sandberg et al. |
| 6,368,092 | B1 | 4/2002 | Lindee et al. |
| 6,669,005 | B2 | 12/2003 | Sandberg et al. |
| 7,065,936 | B2 | 6/2006 | Lindee et al. |
| 7,159,372 | B2 | 1/2007 | Lindee et al. |
| 7,335,013 | B2 | 2/2008 | Hansen et al. |
| 7,533,513 | B2 | 5/2009 | Lindee et al. |
| 8,469,697 | B2 | 6/2013 | Lindee et al. |
| 2001/0043859 | A1* | 11/2001 | Longoria ............... A21C 9/086 414/790 |
| 2006/0054463 | A1* | 3/2006 | Walker ............... B65G 47/31 198/607 |
| 2008/0110723 | A1* | 5/2008 | Yan Ruz ............... B65B 5/067 198/347.1 |
| 2009/0087530 | A1 | 4/2009 | Miller |
| 2013/0291483 | A1 | 11/2013 | Van Gerwen |
| 2017/0349387 | A1* | 12/2017 | Rubio Lamas ...... B65G 57/035 |
| 2019/0291969 | A1* | 9/2019 | Faust ............... B65G 47/266 |

FOREIGN PATENT DOCUMENTS

| | | |
|---|---|---|
| EP | 1285868 B1 | 1/2008 |
| GB | 2164622 A | 3/1986 |
| WO | 02/22446 | 3/2002 |

OTHER PUBLICATIONS

Written Opinion for corresponding International Application No. PCT/US19/36862 dated Sep. 3, 2019, 4 pages.
Petition for Inter Partes Review of U.S. Pat. No. 6,669,005, Case IPR2019-01463, dated Aug. 9, 2019, 87 pages.
Curriculum Vitae of Claire Koelsch Sand, Ph.D.
Combat Ration Advanced Manufacturing Technology Demonstration, Design and Development of a Horizontal Form/Fill/Seal Machine for an Automated Combat Ration Manufacturing Facility.
Petition for Inter Partes Review of U.S. Pat. No. 7,065,936, Case IPR2019-01462, Aug. 9, 2019, 94 pages.
Petition for Inter Partes Review of U.S. Pat. No. 7,533,513, Case IPR2019-01461, Aug. 9, 2019, 80 pages.

* cited by examiner

SHUTTLE CONVEYOR SYSTEMS FOR USE WITH A PATTY FORMING MACHINE

CROSS-REFERENCE TO RELATED APPLICATION(S)

This application claims the priority of U.S. provisional application Ser. No. 62/690,140, filed on Jun. 26, 2018, the contents of which are incorporated herein in its entirety.

FIELD OF THE DISCLOSURE

The present disclosure relates to a shuttle conveyor system for a patty forming machine.

BACKGROUND

Food patties of various kinds, including hamburgers, molded steaks, fish cakes, chicken patties, pork patties, potato patties, and others, are frequently formed in high-volume automated molding machines and then deposited on output conveyors. Challenges arise when stacks of food patties are being processed.

SUMMARY

A jump shuttle conveyor system is configured to receive formed food patties from a molding assembly of a patty forming machine. The system includes a lifting plate and belt assembly coupled to a frame which are configured to be indexed to different vertical positions relative to the frame. Formed food patties are received on a belt of the belt assembly thereon, and can be moved off of the belt onto a transfer shuttle conveyor system. An output conveyor system can be provided to receive the formed food patties.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which.

DETAILED DESCRIPTION

Figure 1:
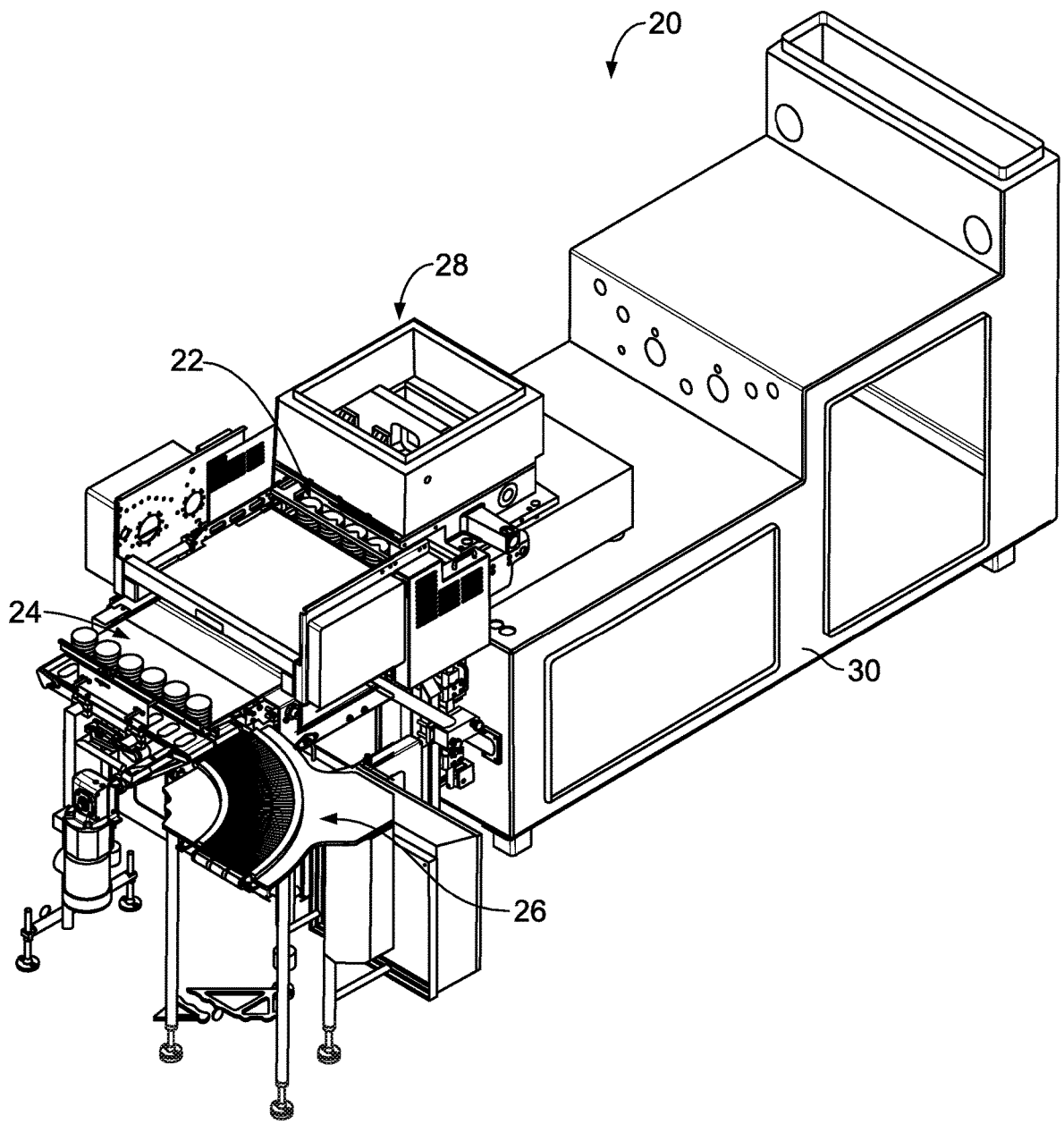
FIG. 1 depicts a front perspective view of a patty forming machine, which includes a jump shuttle conveyor system, a transfer shuttle conveyor system, and an output conveyor system.

While the disclosure may be susceptible to embodiment in different forms, there is shown in the drawings, and herein will be described in detail, a specific embodiment with the understanding that the present disclosure is to be considered an exemplification of the principles of the disclosure, and is not intended to limit the disclosure to that as illustrated and described herein. Therefore, unless otherwise noted, features disclosed herein may be combined together to form additional combinations that were not otherwise shown for purposes of brevity. It will be further appreciated that in some embodiments, one or more elements illustrated by way of example in a drawing(s) may be eliminated and/or substituted with alternative elements within the scope of the disclosure.

Figure 2:
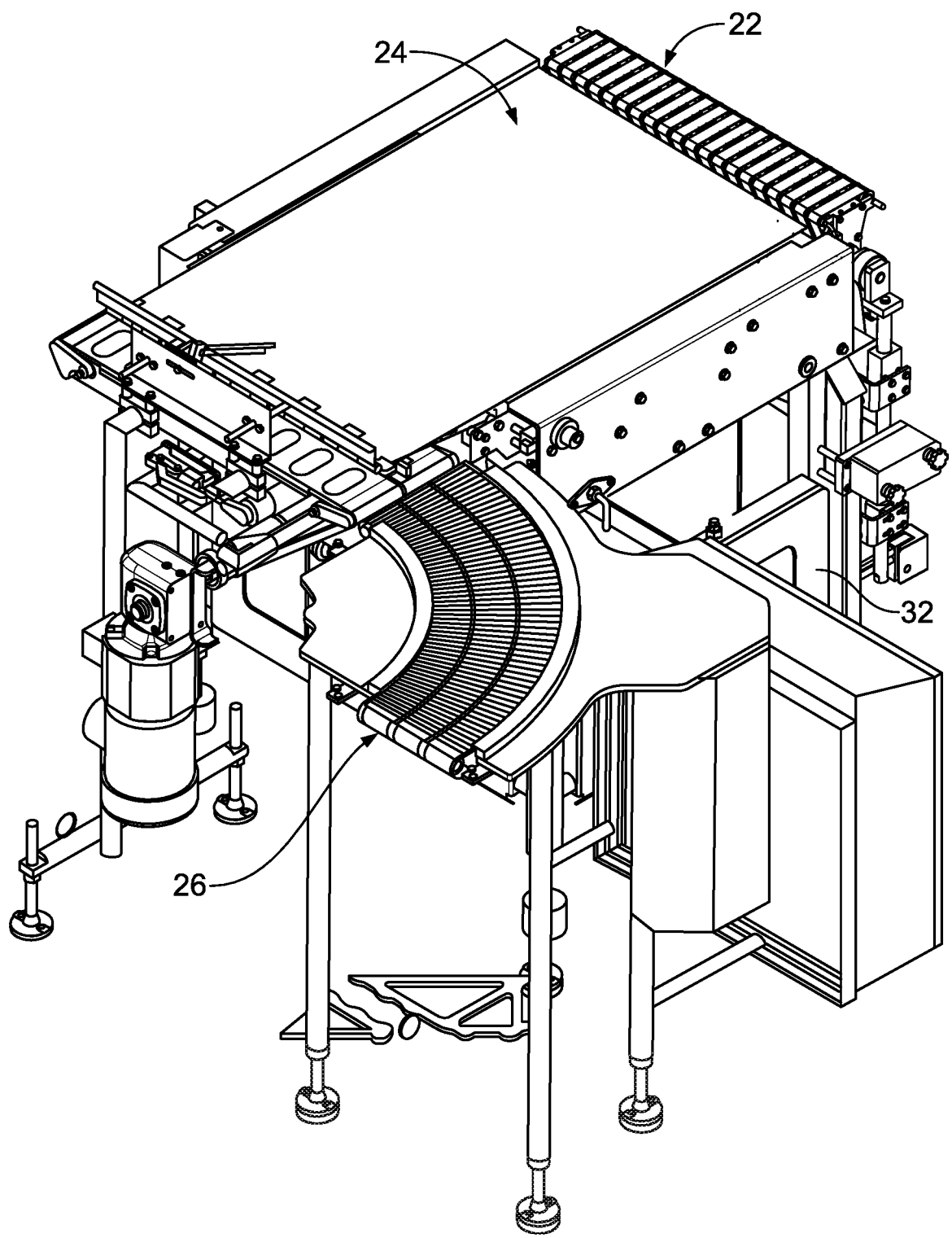
FIG. 2 depicts a front perspective view of the transfer shuttle conveyor system and the output conveyor system.
Figure 21:
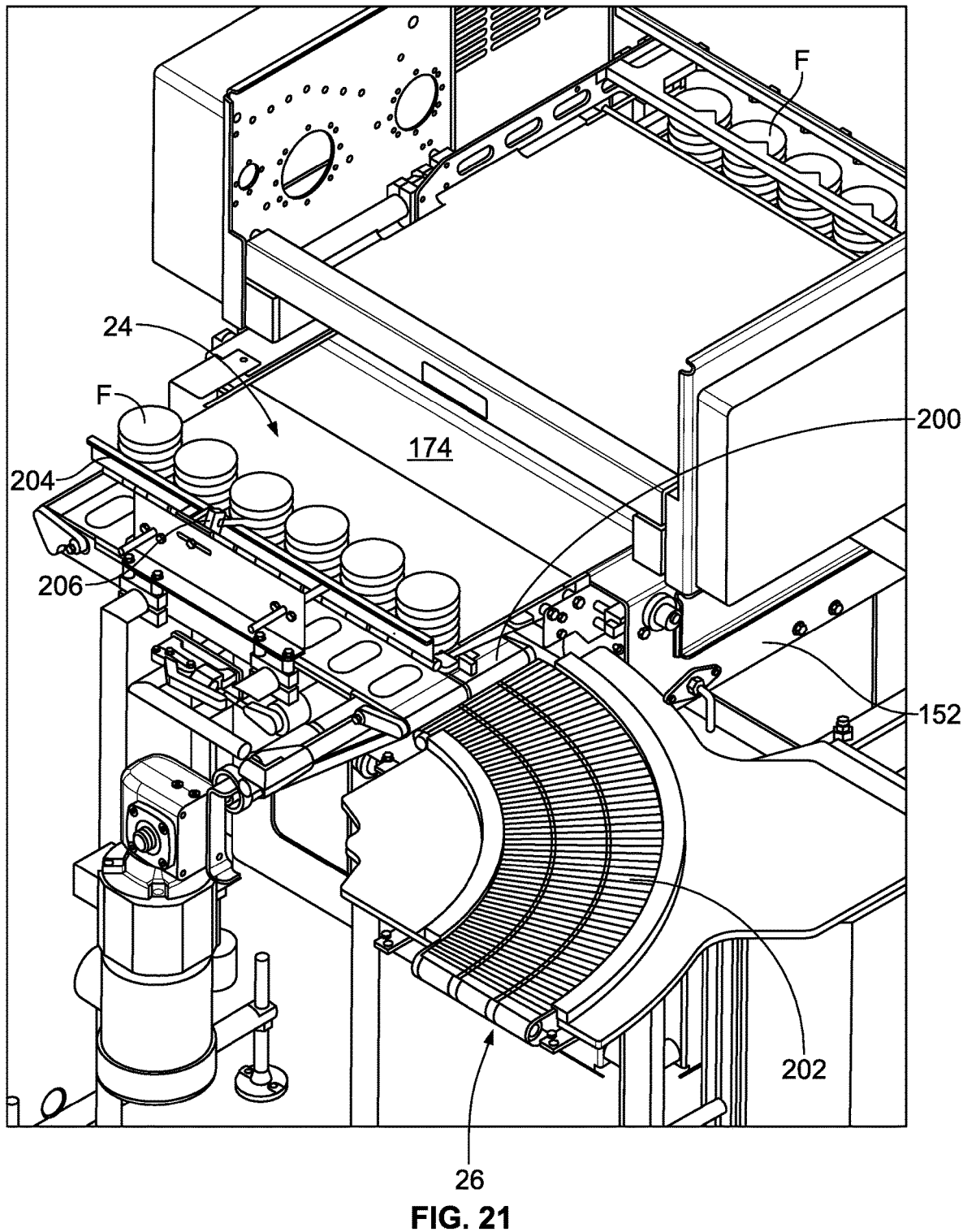
FIG. 21 depicts a partial front perspective view of the transfer shuttle conveyor system in an extended position and the output conveyor system.
Figure 22:
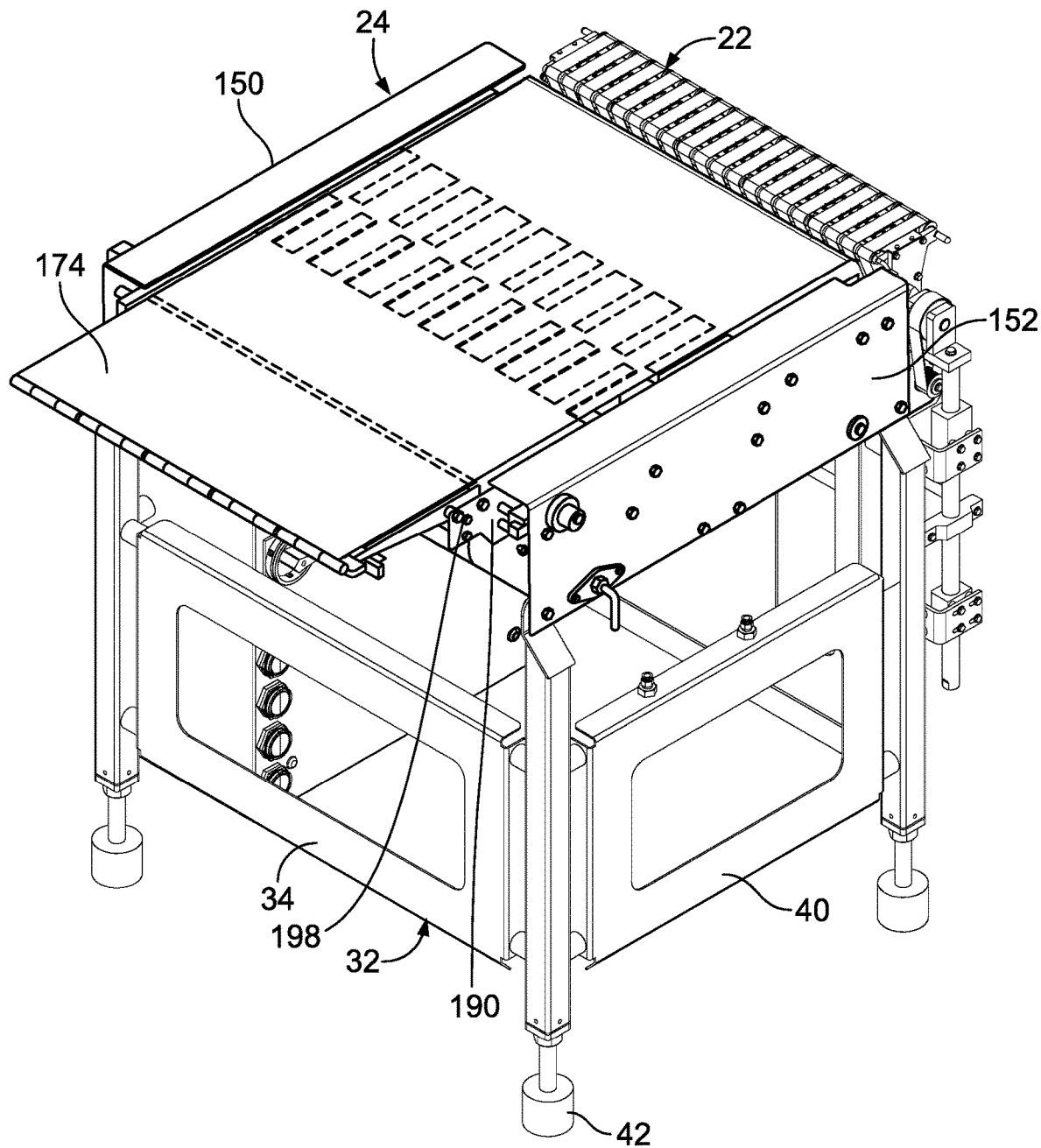
FIG. 22 depicts a front perspective view of the transfer shuttle conveyor system in the extended position.

FIG. 1 illustrates a patty forming machine 20 which forms food patties from moldable food material, and FIGS. 1 and 2 illustrate a plurality of conveyor systems 22, 24, 26 which transport the molded food patties from the patty forming machine 20 to a collection site (not shown). The food patties are shown with reference letter F in FIG. 21. The conveyor systems 22, 24, 26 include a jump shuttle conveyor system 22, a transfer shuttle conveyor system 24 and an output conveyor system 26. In general, the patty forming machine 20 includes a machine base 30 which houses electrical components of the patty forming machine 20, and a feeder portion and a molding assembly 28 mounted on the machine base 30. The molding assembly has a knock-out assembly and an interleaving system. The machine base 30 is optionally mounted upon a plurality of feet which may include rollers or wheels. The machine base 30 supports the operating mechanism for the patty forming machine 20 and contains electrical actuating systems, and most of the machine controls. A control panel, such as a touch screen control panel, may be provided on the machine base 30.

The jump shuttle conveyor system 22 and the transfer shuttle conveyor system 24 are mounted on a frame 32. The frame 32 is removably connected to the machine base 30.

In use, a moldable food material, such as ground beef, fish or the like, is fed into the feeder portion and molding assembly 28 to form molded food patties. The molded food patties are knocked out of the molding assembly by the knock-out assembly and dropped onto the jump shuttle conveyor system 22. As molded food patties are dropped on top of each other on the jump shuttle conveyor system 22, the jump shuttle conveyor system 22 moves downwardly to accommodate the food patties in stacks which form columns. After the desired number of food patties are stacked on each other on the jump shuttle conveyor system 22, the stacks of food patties are moved onto the transfer shuttle conveyor system 24. The transfer shuttle conveyor system 24 then moves the stacks of food patties onto the output conveyor system 26.

Such a feeder portion, molding assembly, knock-out assembly and interleaving system are known in the art. For example, but not limited to, a feeder portion is disclosed in U.S. Pat. No. 8,469,697. For example, but not limited to, a molding assembly for forming a food patty is disclosed in U.S. Pat. No. 7,335,013. For example, but not limited to, a knock-out assembly is disclosed in U.S. Pat. No. 6,368,092. For example, but not limited to, an interleaving system is disclosed in U.S. Pat. No. 7,159,372.

Figure 3:
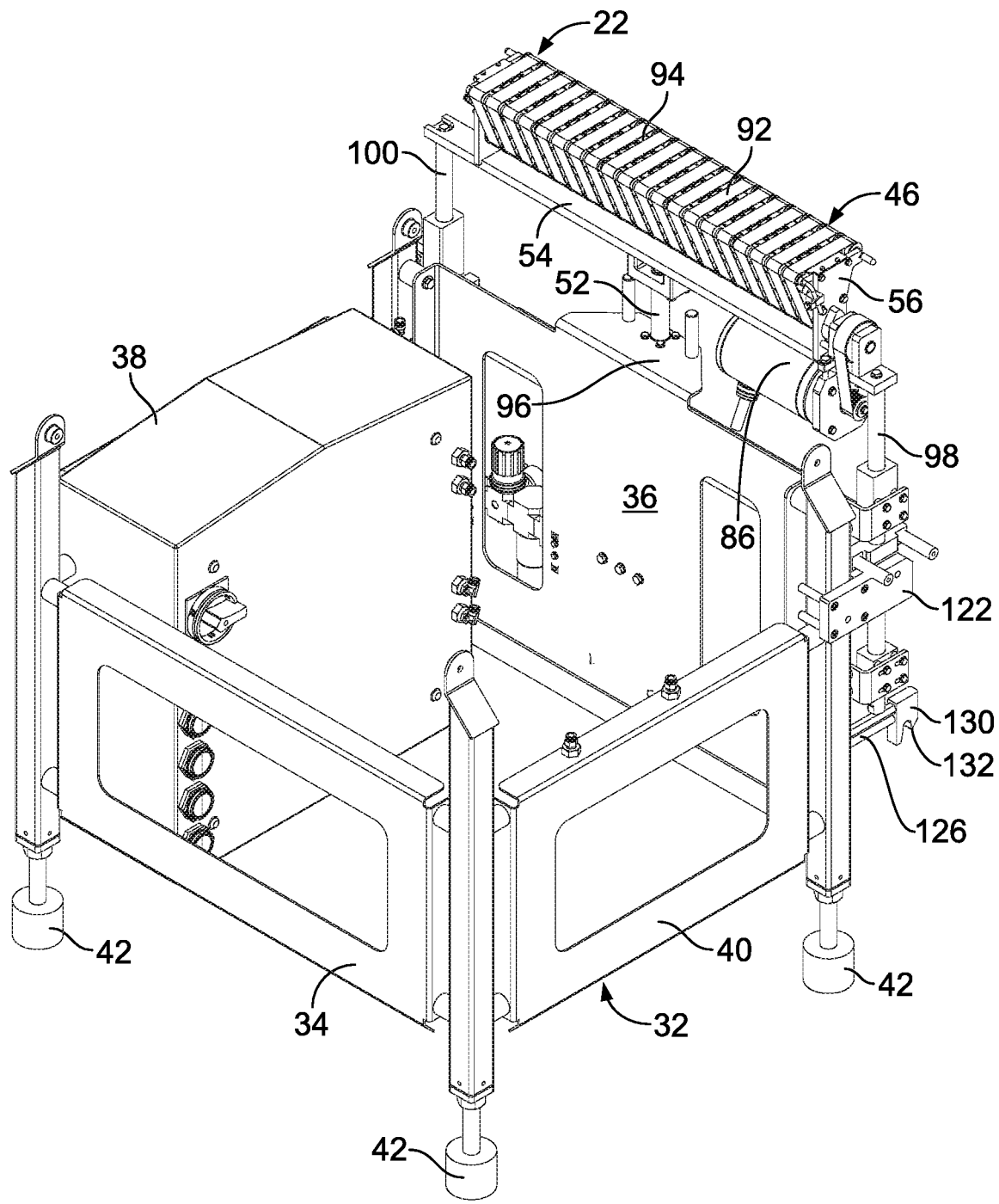
FIG. 3 depicts a front perspective views of the jump shuttle conveyor system in a raised position.
Figure 4:
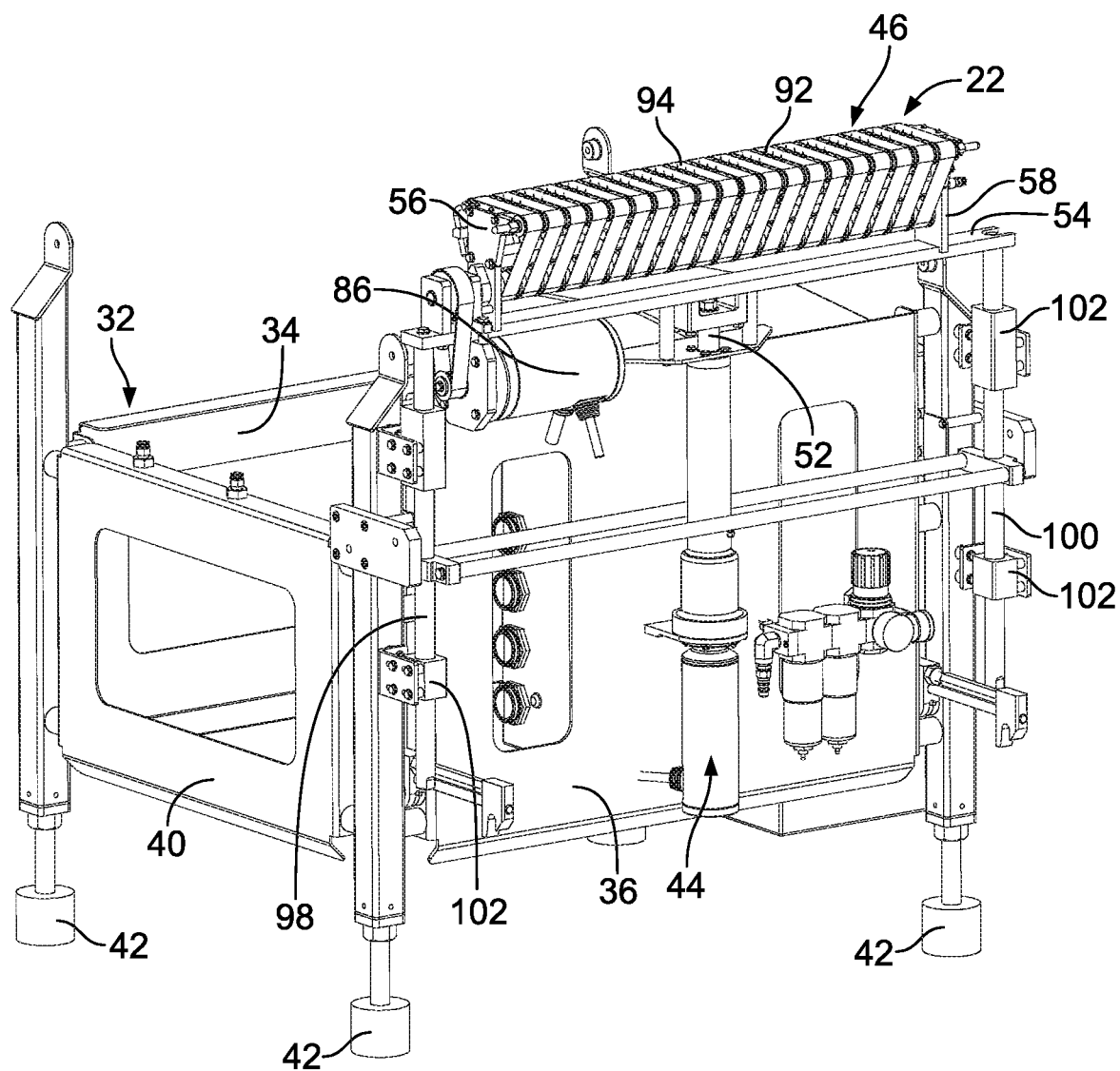
FIG. 4 depicts a rear perspective views of the jump shuttle conveyor system in a raised position.
Figure 5:
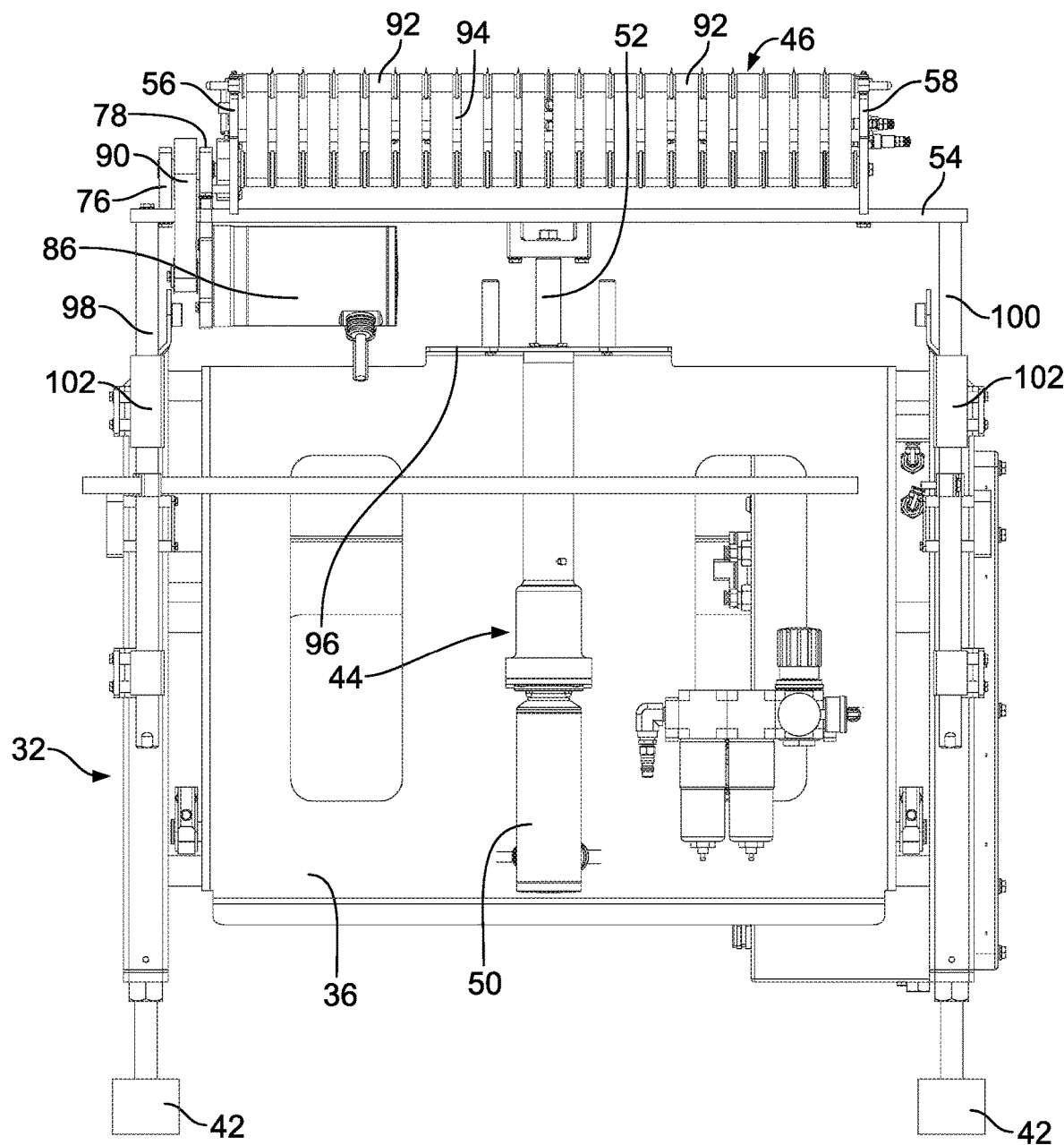
FIG. 5 depicts a rear elevation view of the jump shuttle conveyor system in the raised position.
Figure 6:
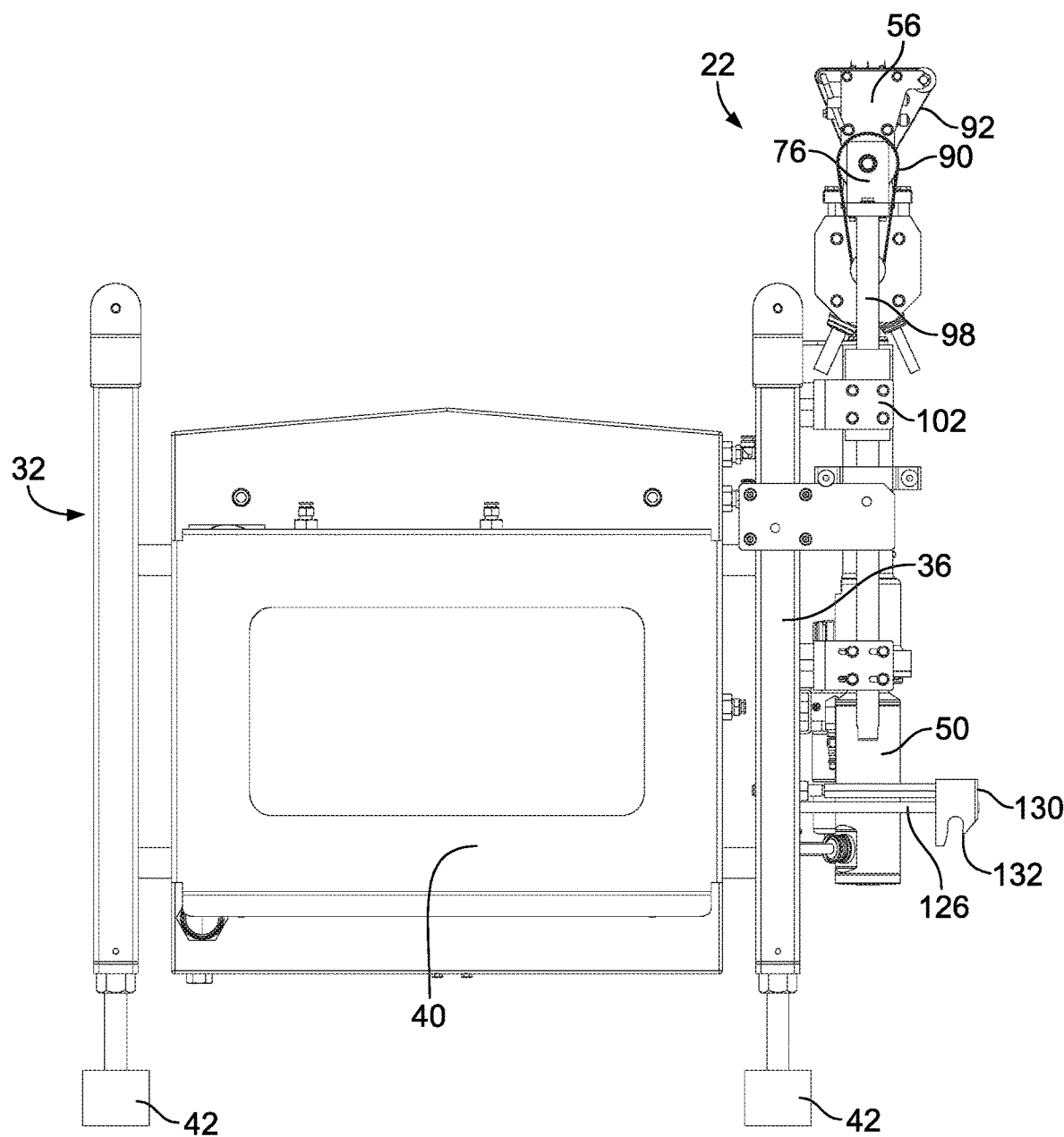
FIG. 6 depicts a side elevation view of the jump shuttle conveyor system in the raised position.
Figure 7:
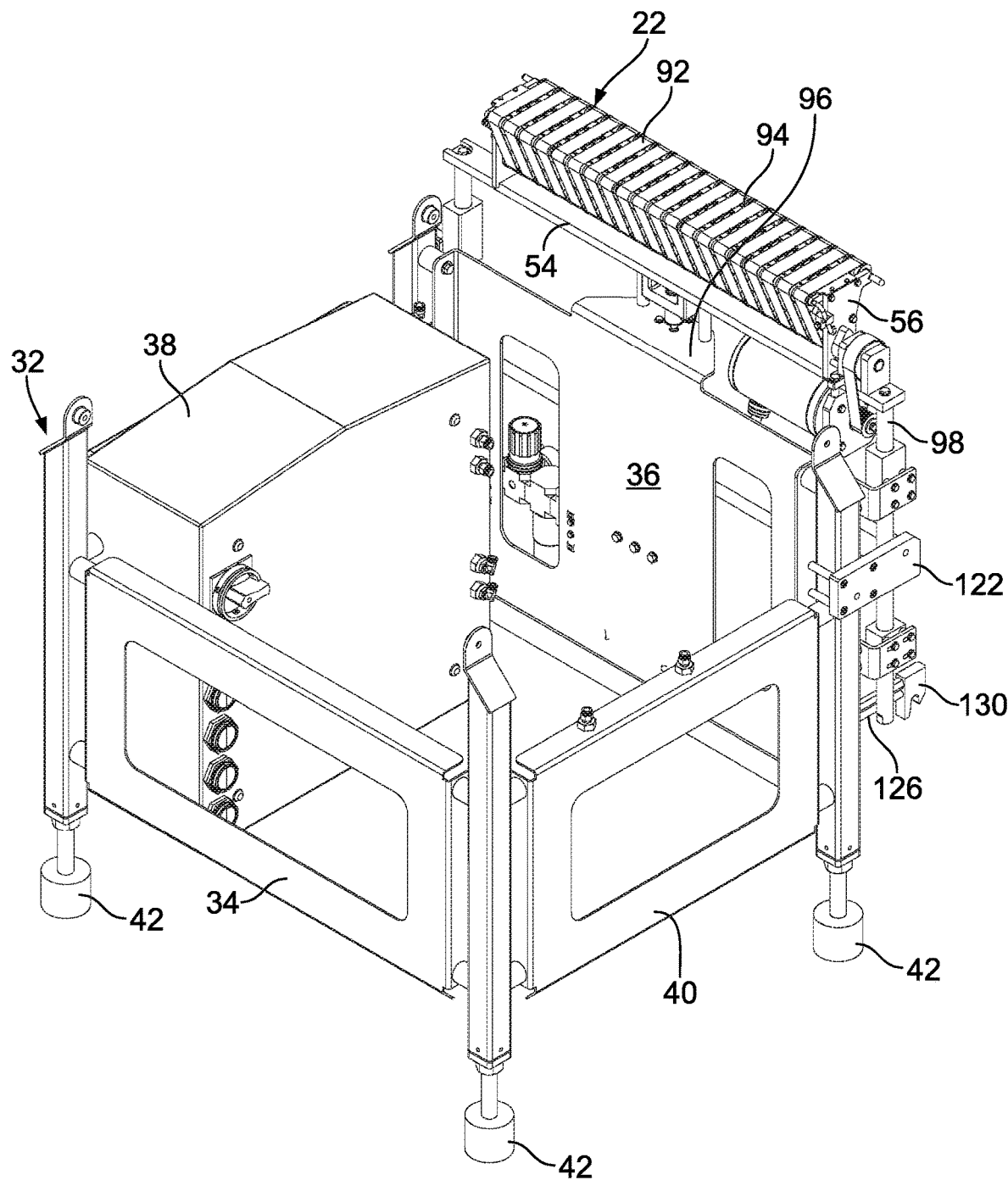
FIG. 7 depicts a rear perspective views of the jump shuttle conveyor system in a lowered position.
Figure 8:
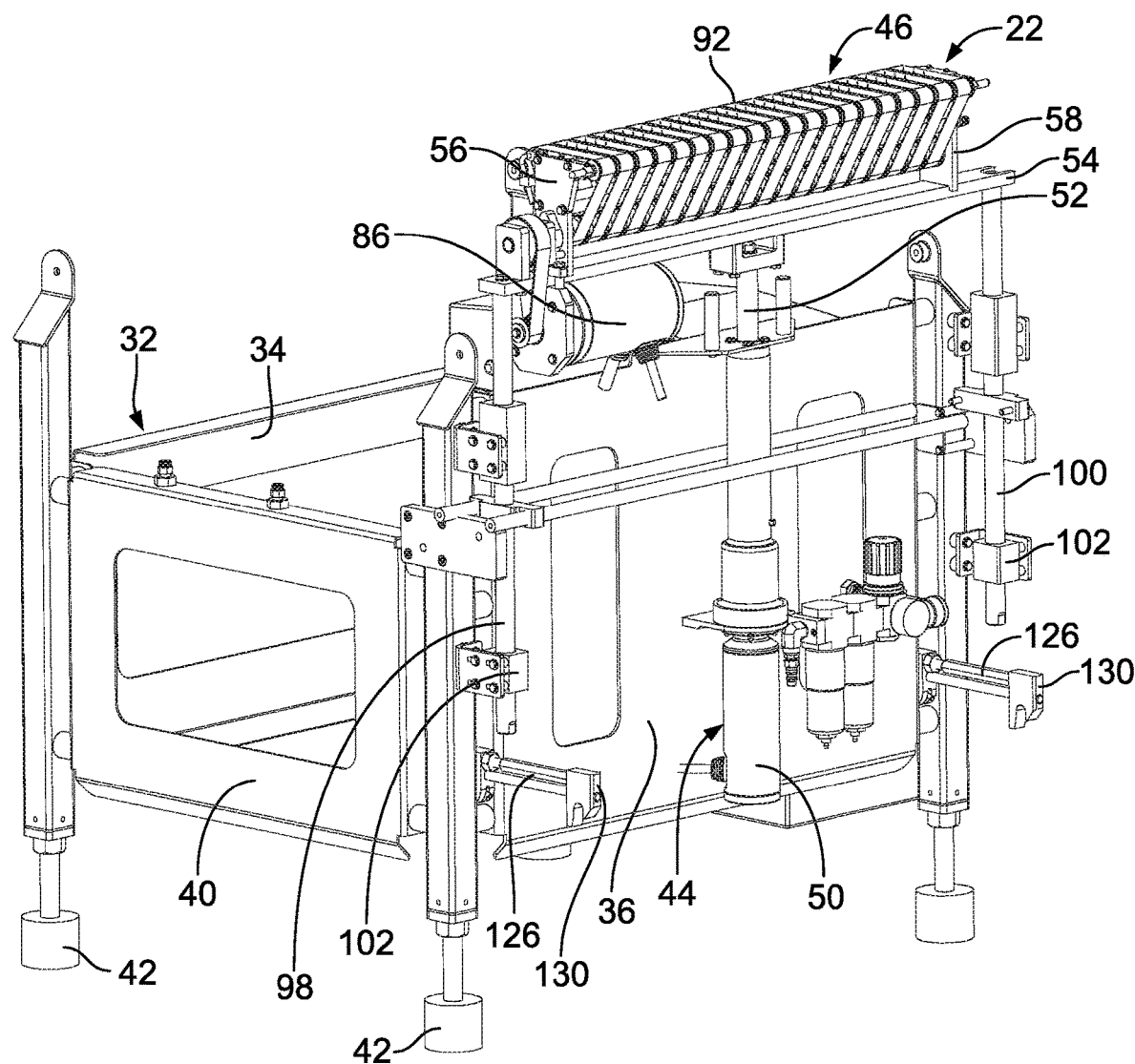
FIG. 8 depicts a rear plan view of the jump shuttle conveyor system in the lowered position.
Figure 9:
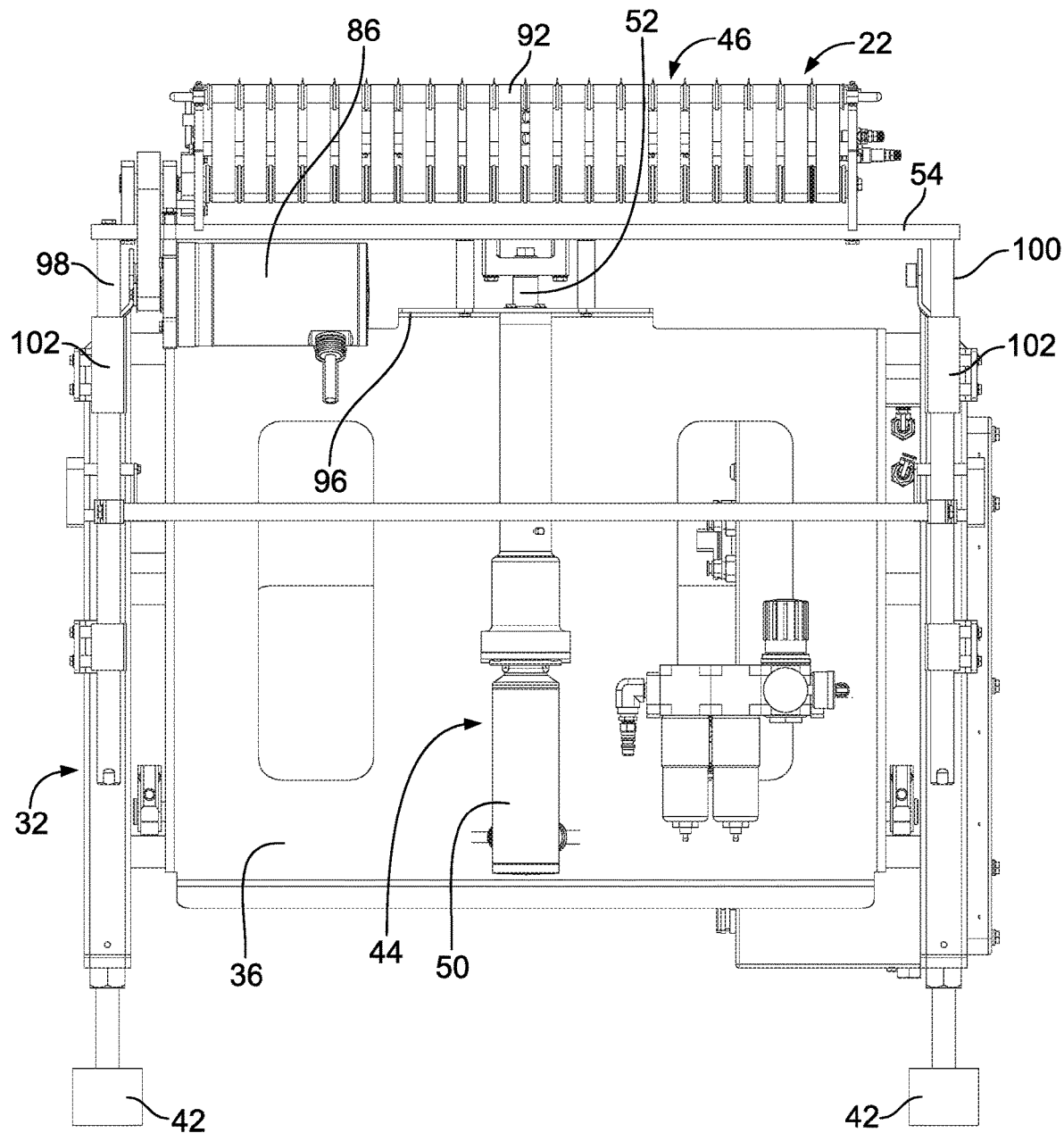
FIG. 9 depicts a rear elevation view of the jump shuttle conveyor system in the lowered position.
Figure 10:
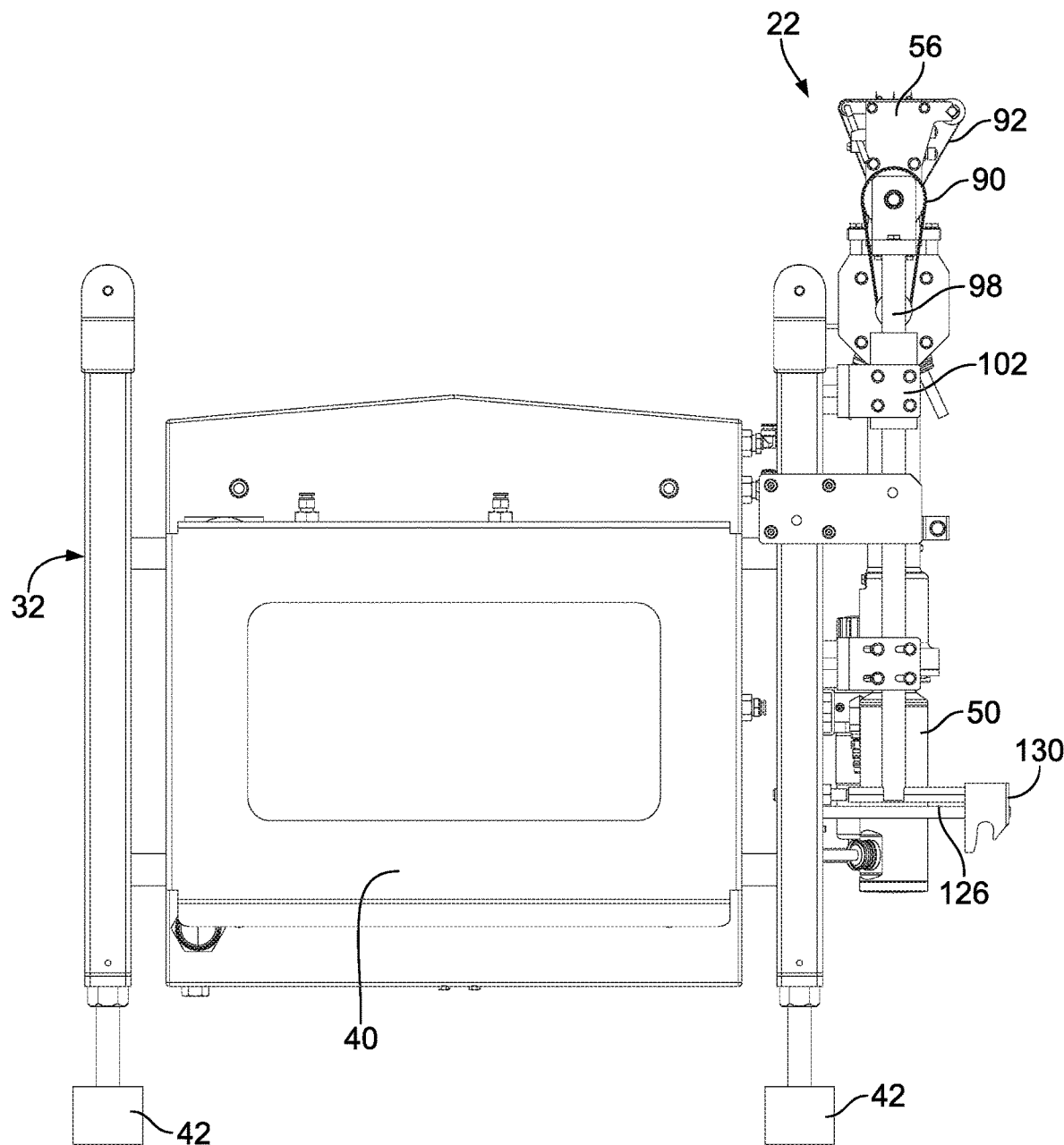
FIG. 10 depicts a side elevation view of the jump shuttle conveyor system in the lowered position.
Figure 11:
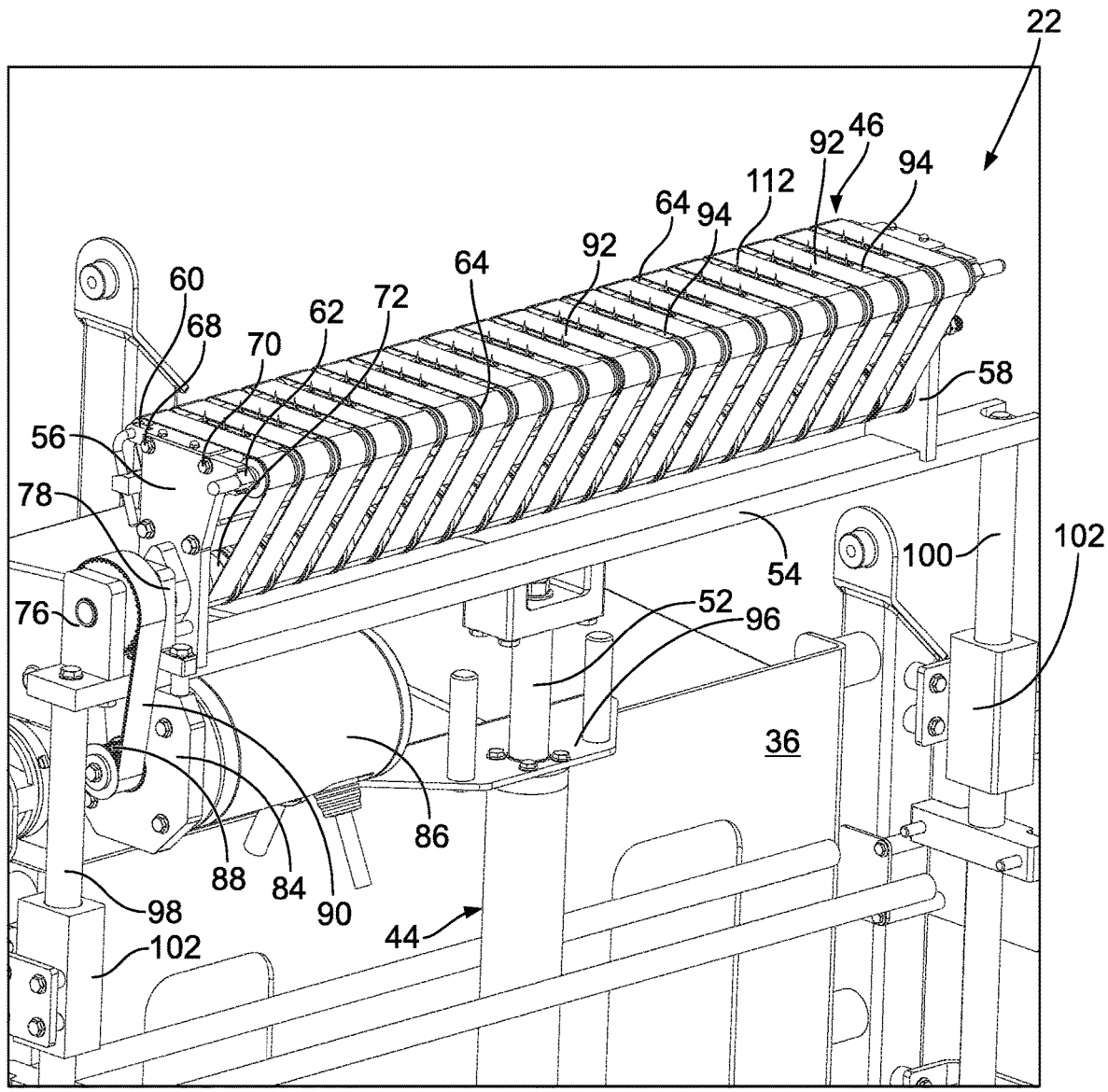
FIG. 11 depicts a partial rear perspective view of the jump shuttle conveyor system in the lowered position.

As shown in FIG. 3, the frame 32 has an upstanding front wall 34, an upstanding opposite rear wall 36 and upstanding side walls 38, 40 connecting the front and rear walls 34, 36 together. The frame 32 is optionally mounted upon a plurality of feet 42, which may include rollers or wheels, at the corners between the walls 34, 36, 38, 40.

The jump shuttle conveyor system 22 includes a belt lifting assembly 44 mounted on the rear wall 36 and a belt assembly 46 mounted on the belt lifting assembly 44. In an embodiment, a pin assembly 48 is provided. The belt lifting assembly 44 is used to lower the belt assembly 46 from a raised position, see FIGS. 3-6, to a lowered position, see FIGS. 7-11.

The belt lifting assembly 44 includes a motor 50 mounted on the rear wall 36 and an actuating rod 52 extending therefrom. The actuating rod 52 extends above a top end of the rear wall 36 and is attached to the belt assembly 46. When the actuating rod 52 is actuated by the motor 50, the belt assembly 46 is lowered or raised. In an embodiment, the motor 50 and actuating rod 52 are formed of a motor operated piston. In an embodiment, the motor 50 and actuating rod 52 are formed of an electric motor, servo motor or the like. In an embodiment, the motor 50 and actuating rod 52 are formed as part of a servo motor driven system. The belt lifting assembly 44 further includes a horizontal lifting plate 54 having pair of spaced apart drive shaft support plates 56, 58 extending vertically upward therefrom. The actuating rod 52 is attached to an underside of the lifting plate 54.

The belt assembly 46 includes a pair of upper rods 60, 62 which are affixed to and extend horizontally between the drive shaft support plates 56, 58, and are vertically aligned with each other. Each upper rod 60, 62 has at least one freely rotatable roller 64 mounted thereon. The rollers 64 form a plurality of spaced apart channels.

Figure 12:
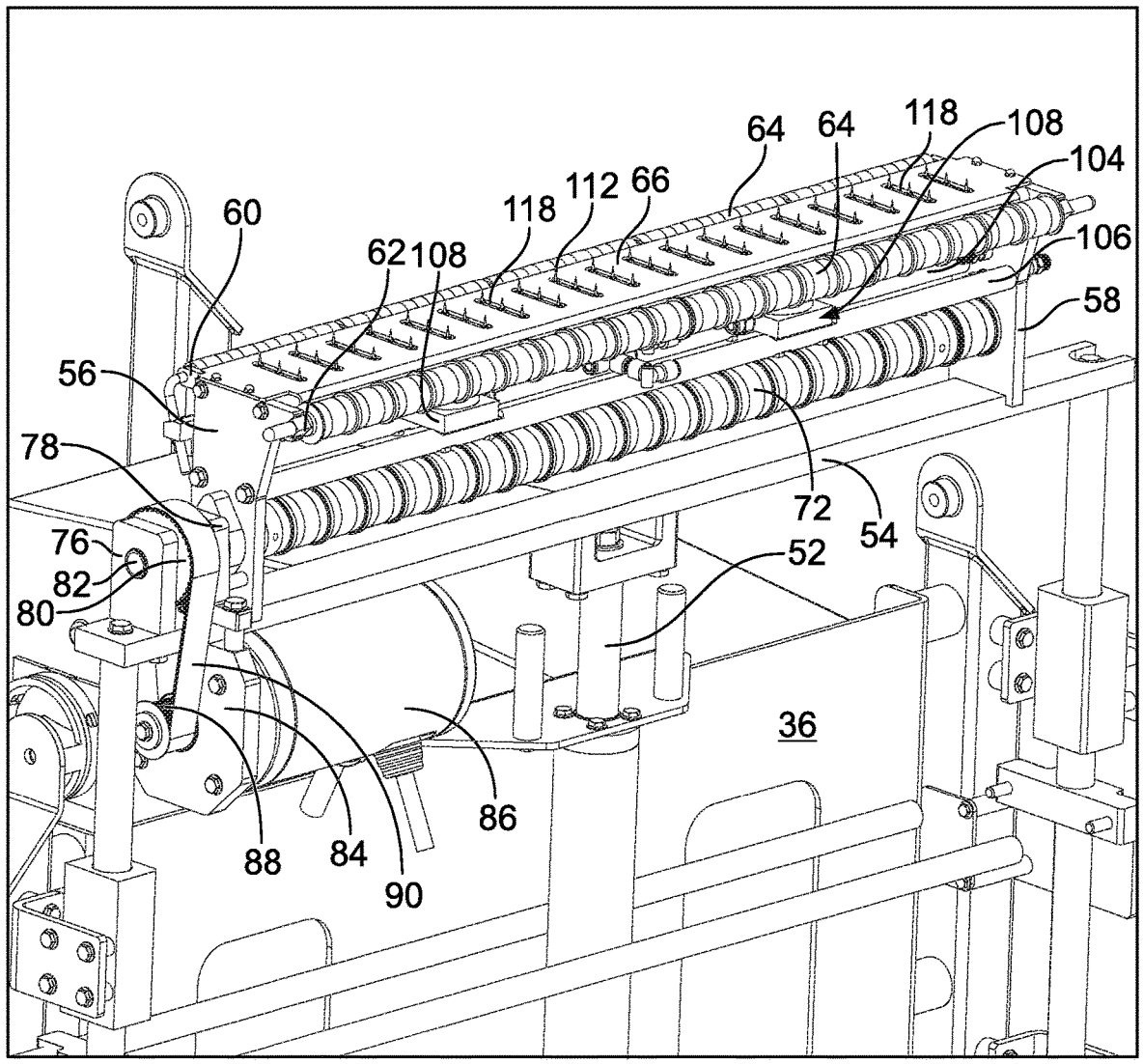
FIG. 12 depicts a partial rear perspective view of the jump shuttle conveyor system in the lowered position with belts thereof removed.
Figure 16:
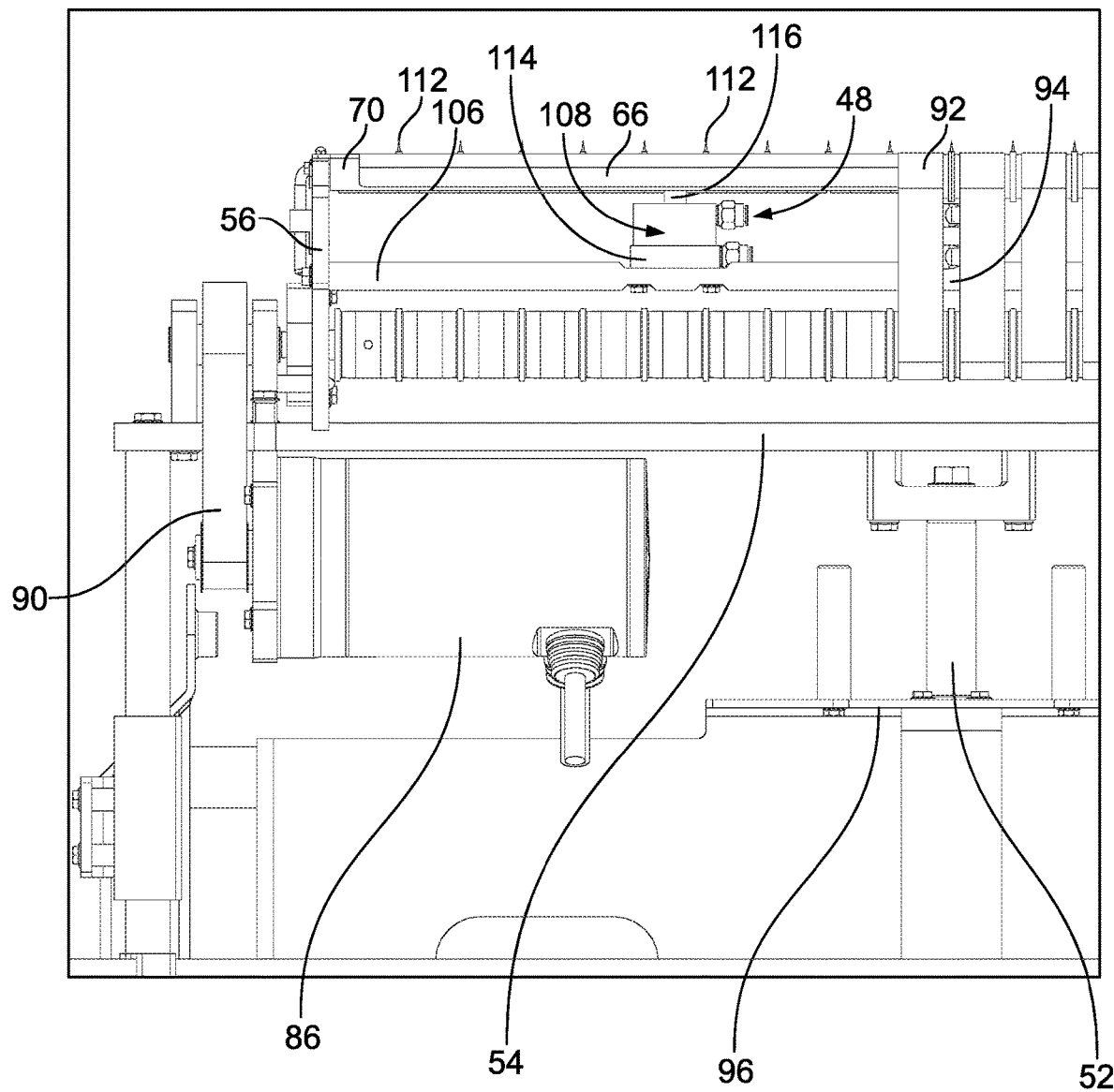
FIG. 16 depicts a rear elevation view of the jump shuttle conveyor system with components removed to show internal components of the jump shuttle conveyor system.

A patty support plate 66, see FIGS. 12, 16 and 16, is affixed to and extends horizontally between the vertical drive shaft support plates 56, 58 and is positioned between the upper rods 60, 62. An upper surface of the patty support plate 66 is vertically aligned with an upper extent of the upper rods 60, 62. A pair of rods 68, 70 are affixed to and extend horizontally between the support plates 56, 58 and engage a lower surface of the patty support plate 66 to provide rigidity to the patty support plate 66.

Figure 13:
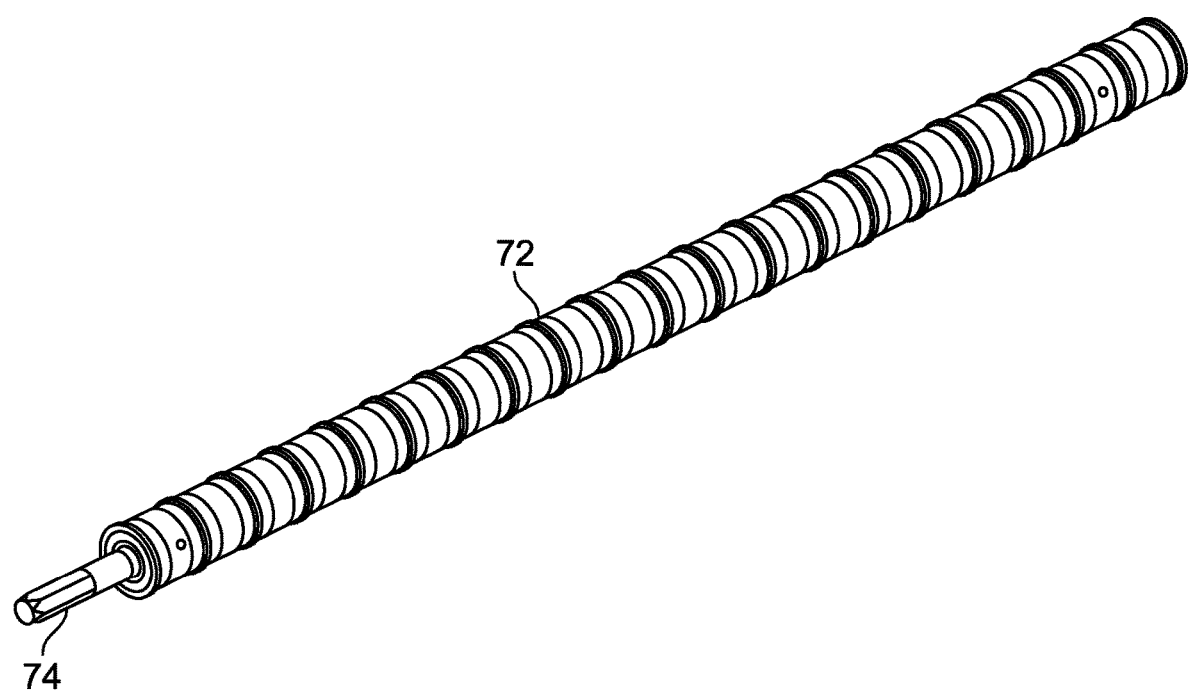
FIG. 13 depicts a perspective view of a lower drive shaft of the jump shuttle conveyor system.
Figure 14:
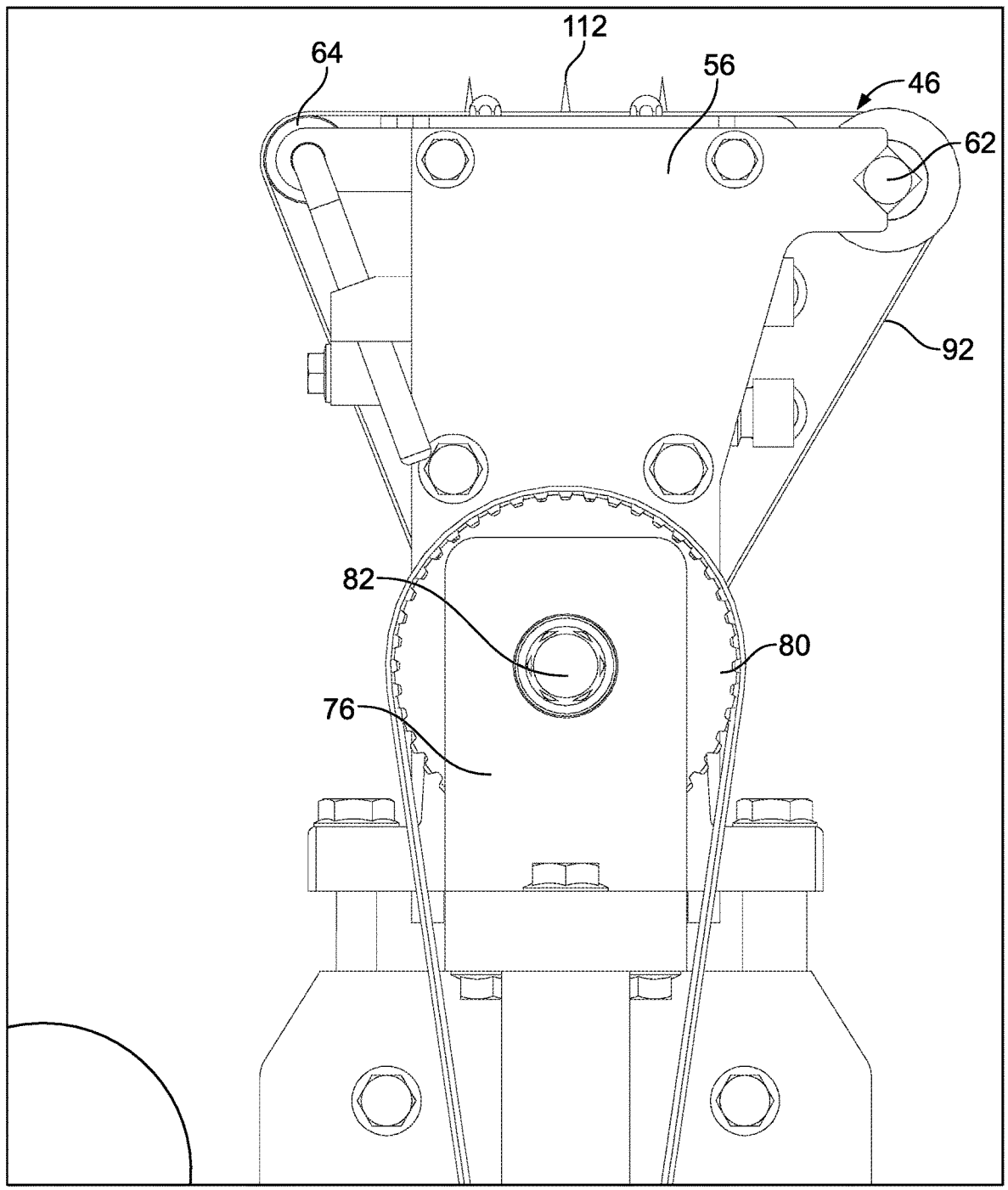
FIGS. 14 and 15 depict side elevation views of the jump shuttle conveyor system with components removed to show internal components of the jump shuttle conveyor system.

A lower drive shaft 72 extends horizontally between the drive shaft support plates 56, 58 and is vertically offset downward from the upper rods 60, 62. The lower drive shaft 72 is rotatable relative to the drive shaft support plates 56, 58. The lower drive shaft 72 has a plurality of spaced apart channels provided thereon. The lower drive shaft 72 has an end 74, see FIG. 13, which extends through the drive shaft support plate 56.

The rods 60, 62 and the drive shaft 72 generally form a triangle such that the respective channels align with each other to form a plurality of continuous loops.

A pair of spaced apart gear support plates 76, 78 extend upward from the lifting plate 54 proximate to the drive shaft support plate 56. A toothed gear 80 is rotatably mounted between the gear support plates 76, 78 by a rod 82. A vertical motor support plate 84 extends downward from the lifting plate 54 and aligns with gear support plate 78. A motor 86 is mounted on the motor support plate 84. A rod of the motor 86 extends through the motor support plate 84 and has a toothed gear 88. A belt 90 surrounds the gear 80 and the gear 88. In an embodiment, the motor 86 is an electric motor, servo motor or the like. In an embodiment, the motor 86 is formed as part of a servo motor driven system.

The end 74 of the lower drive shaft 72 is engaged within the gear 80. The end 74 of the lower drive shaft 72 may have a hexagonal shape thereon which engages with a like hexagonally shaped opening in the gear 80, which allows the lower drive shaft 72 to rotate with the gear 80, but allows for the easy disassembly of the lower drive shaft 72 from the gear 80.

A belt 92 is seated within each set of aligned channels on the rollers 64 on the upper rod 60, 62 and on the lower drive shaft 72, and each belt 92 forms a continuous loop. The belts 92 are spaced apart from each other by gaps 94. The belts 92 engage the upper surface of the patty support plate 66 which provides support for the belts 92.

To lower or raise the belt assembly 46, the belt lifting assembly 44 is actuated which causes the actuating rod 52 to retract or extend. When the actuating rod 52 retracts or extends, since the actuating rod 52 is fixedly attached to the lifting plate 54, the entire belt assembly 46 is lowered or raised.

The actuating rod 52 may extend through a flange 96 which extends outwardly from the rear wall 36. The flange 96 provides support to the actuating rod 52.

In an embodiment, a pair of vertical support rods 98, 100 extend downward from the opposite ends of the lifting plate 54 and extend through bearing guides 102 extending outward from the rear wall 36. When the belt assembly 46 is lowered or raised by the belt lifting assembly 44, the support rods 98, 100 assist in stabilizing the belt assembly 46.

The belts 92 receive the molded food patties on the upper surfaces thereof after molded food patties are knocked out of the molding assembly and are dropped onto the jump shuttle conveyor system 22. The molded food patties may be on paper to separate the molded food patties from the belts 92, or may directly contact the belts 92. Initially, the belt assembly 46 is raised by the belt lifting assembly 44 to an uppermost position so that the belts 92 can receive the first row of a new set of food patties. During this action, the motor 86 is not engaged such that the belts 92 are stationary.

In use, the molding assembly of the patty forming machine 20 deposits a first row of molded food patties onto the belts 92. The belt lifting assembly 44 then indexes the belt assembly 46 vertically downwardly to accommodate the second row of molded food patties which are then deposited on top of the food patties in the first row to form columns of food patties. The belt lifting assembly 44 then indexes the belt assembly 46 vertically downwardly to accommodate the third row of molded food patties which are then deposited on top of the food patties in the second row. This continues until the desired number of food patties are in the columns. The movement of the belt lifting assembly 44 is controlled by a suitable control system (not shown) which is configured to index the belt assembly 46 vertically downwardly as rows of molded patties are deposited on the belts 92.

After the desired number of food patties are stacked on each other on the belts 92, the stacks of food patties are moved onto the transfer shuttle conveyor system 24 by actuating the motor 86. When the motor 86 is actuated, the gear 88 rotates, which causes rotation of the belt 90, which in turn causes rotation of the gear 80 and the lower drive shaft 72. The belts 92 are frictionally engaged with the lower drive shaft 72 such that when the lower drive shaft 72 is rotated, the belts 92 rotate around the rollers 64 on the upper rods 60, 62 and the belts 92 circulate around the lower drive shaft 72 and the upper rods 60, 62. This causes the stacks of food patties to move off of the jump shuttle conveyor system 22 and onto the transfer shuttle conveyor system 24. After the stacks of food patties are moved off of the jump shuttle conveyor system 22, the belt assembly 46 is raised by the belt lifting assembly 44 to its uppermost position to receive the first row of a new set of food patties.

Figure 15:
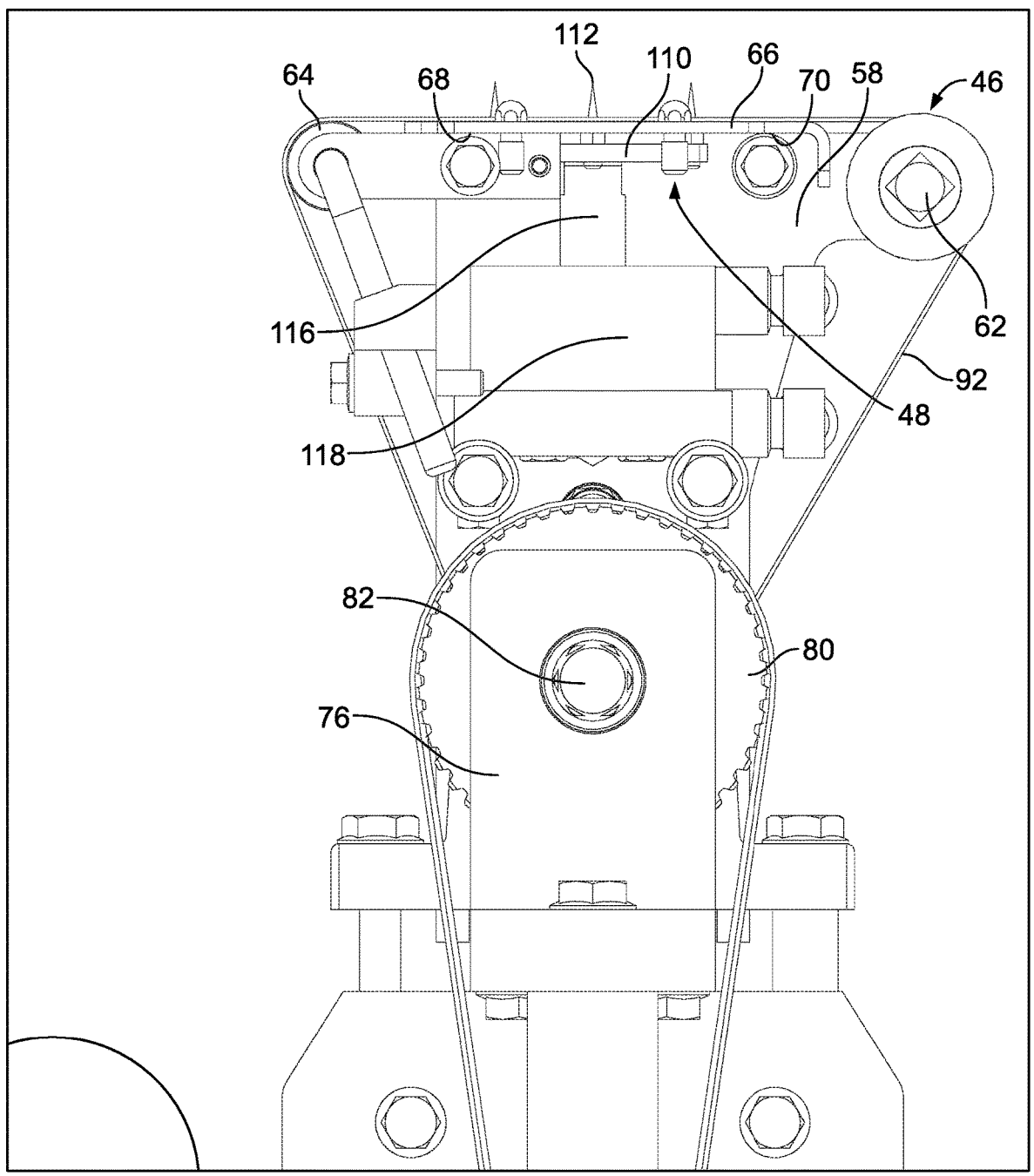
Figure 17:
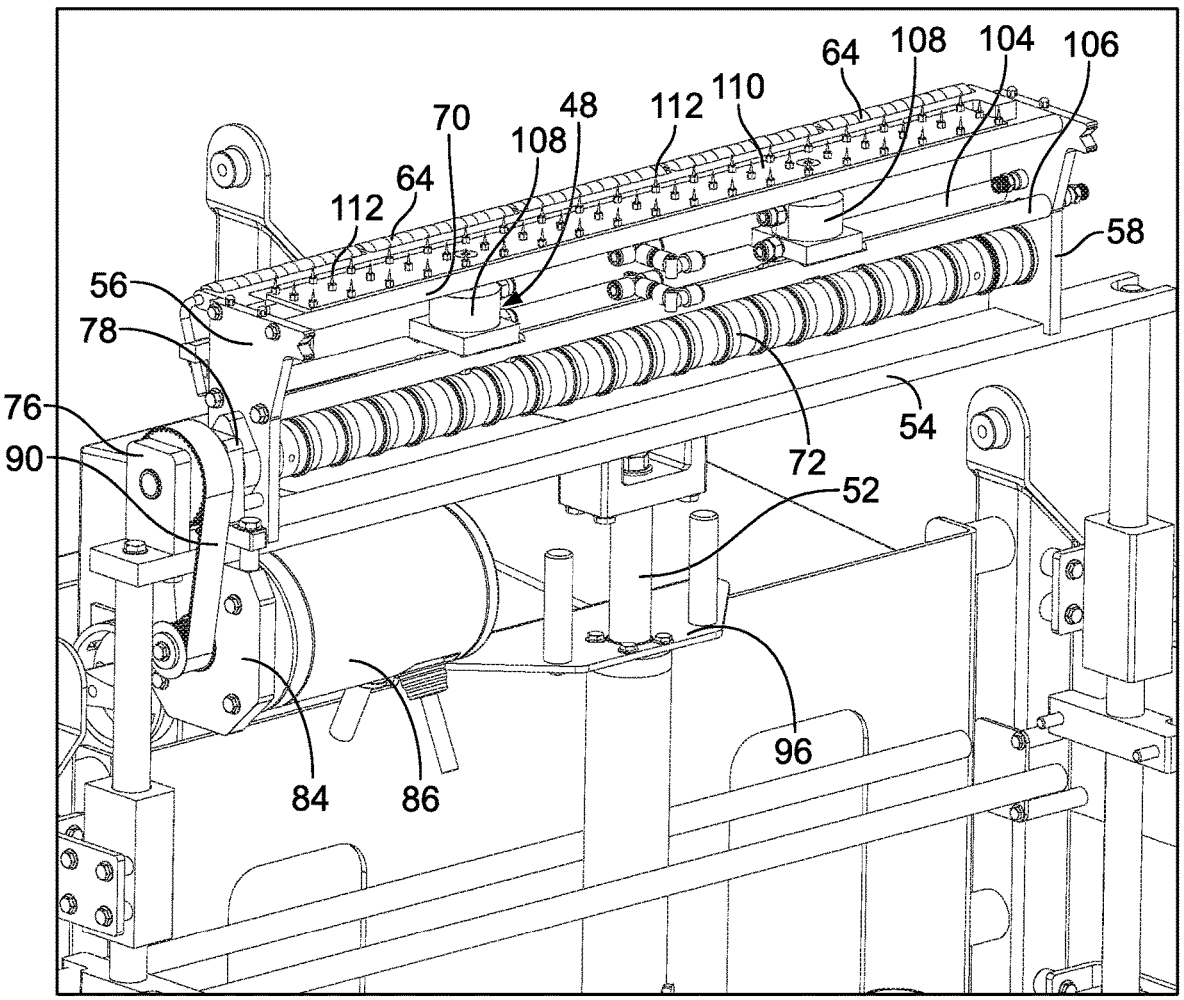
FIG. 17 depicts a rear perspective view of the jump shuttle conveyor system with components removed to show internal components of the jump shuttle conveyor system.

In an embodiment, the pin assembly 48 is provided, see FIGS. 15-17. The pin assembly 48 includes a pair of mounting bars 104, 106, a plurality of actuators 108 mounted on the mounting bars 104, 106, a horizontal pin plate 110 attached to an upper end of the actuators 108, and a plurality of spaced apart pins 112 which extend vertically upward from an upper surface of the pin plate 110.

The mounting bars 104, 106 are affixed to and extends horizontally between the drive shaft support plates 56, 58, are downward of the upper rods 60, 62, and are upward of the lower drive shaft 72. The mounting bars 104, 106 are vertically aligned with each other and are within the interior of the triangle formed by the rods 60, 62 and the drive shaft 72.

The actuators 108 may be air-actuated pistons. A housing 114 of each actuator 108 is affixed to an upper surface of the mounting bars 104, 106 and actuating rods 116 extend upward from the housings 114 and are affixed to an underside of the pin plate 110. The pin plate 110 is provided below the patty support plate 66.

The pins 112 may be orientated in an array and form a plurality of rows and columns.

When the pin assembly 48 is provided, the patty support plate 66 has a plurality of holes 118 through which the pins 112 extend.

When the belt assembly 46 is raised by the belt lifting assembly 44 to its uppermost position so that the belts 92 can receive the first row of a new set of food patties, the pin assembly 48 is actuated to move the pins 112 upwardly to extend through the holes 118 in the patty support plate 66. To affect this, the actuators 108 are actuated which causes the actuating rods 116 to extend from the housings 114. This moves the pin plate 110 upwardly toward the patty support plate 66 and the pins 112 extend through the holes 118 and outwardly from the upper surface of the patty support plate 66. The pins 112 extend in the gaps 94 between the belts 92. In an embodiment the pin plate 110 is moved upwardly until the pin plate 110 engages the underside of the patty support plate 66.

When the belts 92 receive the first row of molded food patties on the upper surfaces thereof, the pins 112 pierce the underside of the first row of the molded food patties. This assists in deterring the first row of the molded food patties from sliding on the belts 92. To move the columns of food patties onto the transfer shuttle conveyor system 24, the pins 112 are retracted from engagement with first row of molded food patties by actuating the actuators 108 which causes the actuating rods 116 to retract into the housings 114, thereby moving the pin plate 110 downwardly away from the patty support plate 66. When this is affected, the pins 112 are completed retracted into the holes 118 such that the pins 112 do not extend outwardly from the upper surface of the patty support plate 66. This prevents the pins 112 from damaging the food patties when the food patties are transferred onto the transfer shuttle conveyor system 24. The pins 112 may be retracted at any point after the first row of food patties is dropped onto the belts 92.

The frame 32 can be quickly coupled to and decoupled from the machine base 30. In an embodiment, the feeder portion and molding assembly 28 is cantilevered relative to the remainder of the machine base 30 such that the feeder portion and molding assembly 28 are positioned above the jump shuttle conveyor system 22 so that the molded food patties are dropped onto the belts 92. In an embodiment, a pair of angled bars 120, see FIGS. 18-20, extend between the feeder portion and molding assembly 28 and the remainder of the machine base 30 to support this cantilevered position. The jump shuttle conveyor system 22 is positioned between the angled bars 120.

Figure 19:
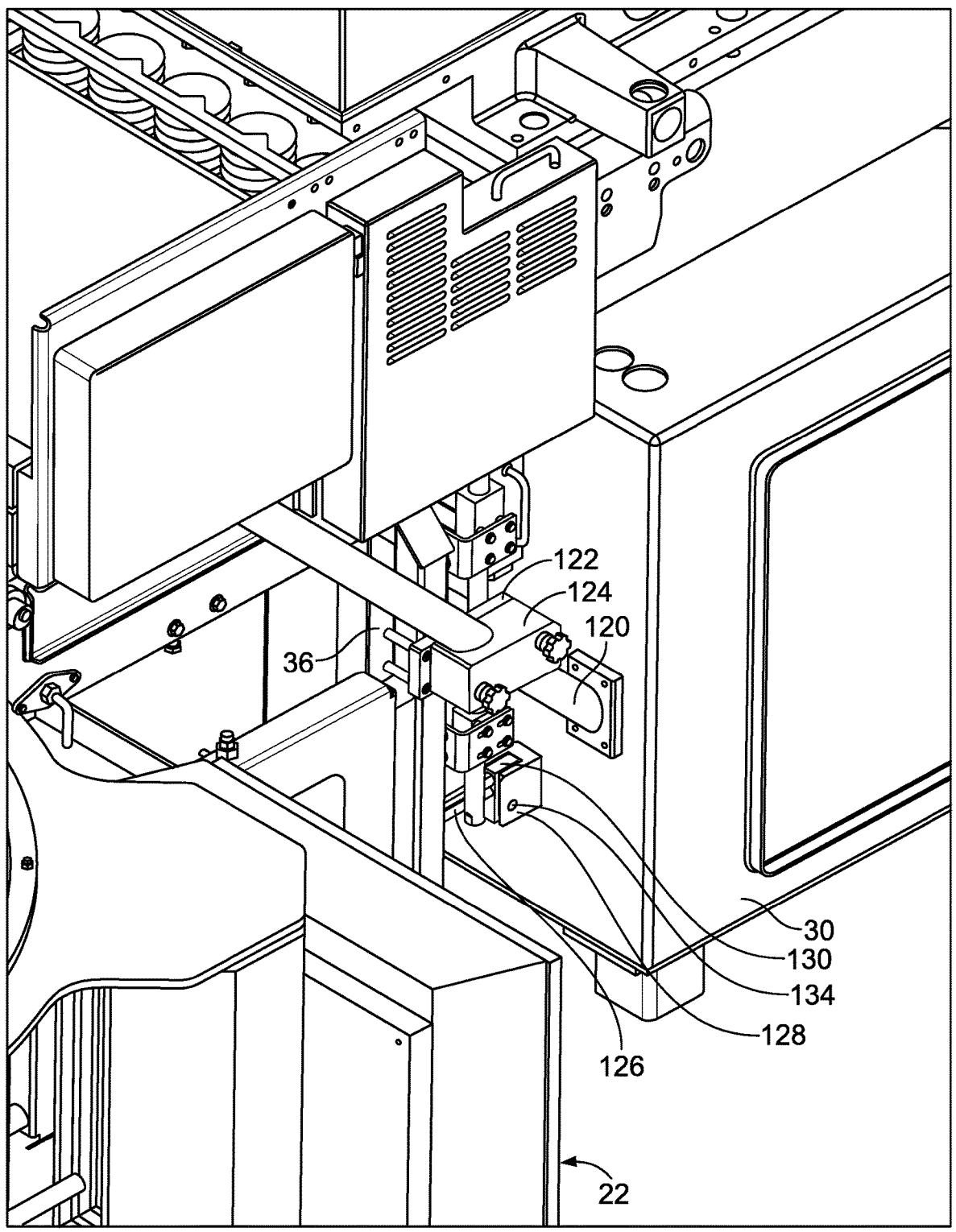
FIG. 19 depicts a partial front perspective view of the patty forming machine showing the connection between a machine base of the patty forming machine and the jump shuttle conveyor system.
Figure 20:
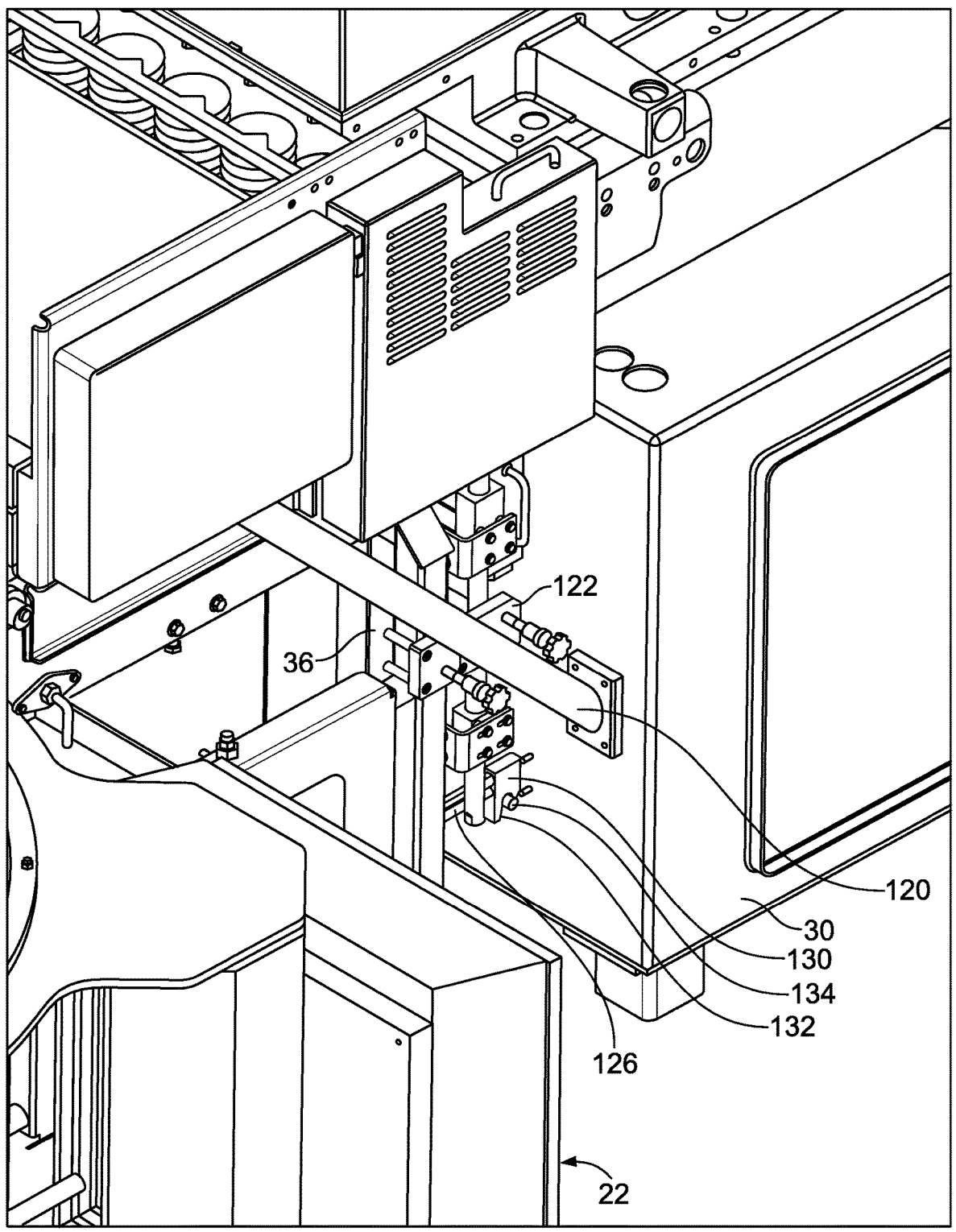
FIG. 20 depicts a partial front perspective view of the patty forming machine showing the connection between the machine base and the jump shuttle conveyor system, with a cover of the connection removed.

The frame 32 of the jump shuttle conveyor system 22 includes clamp plates 122, see FIG. 20, which extend rearward from, and are affixed to, each side wall 38, 40. When the jump shuttle conveyor system 22 is positioned between the angled bars 120, the angled bars 120 abut against the respective clamp plates 122. A cover 124, see FIGS. 18 and 19, is thereafter attached to the respective clamp plate 122 and sandwiches the angled bars 120 between the respective clamp plate 122 and the covers 124.

Figure 18:
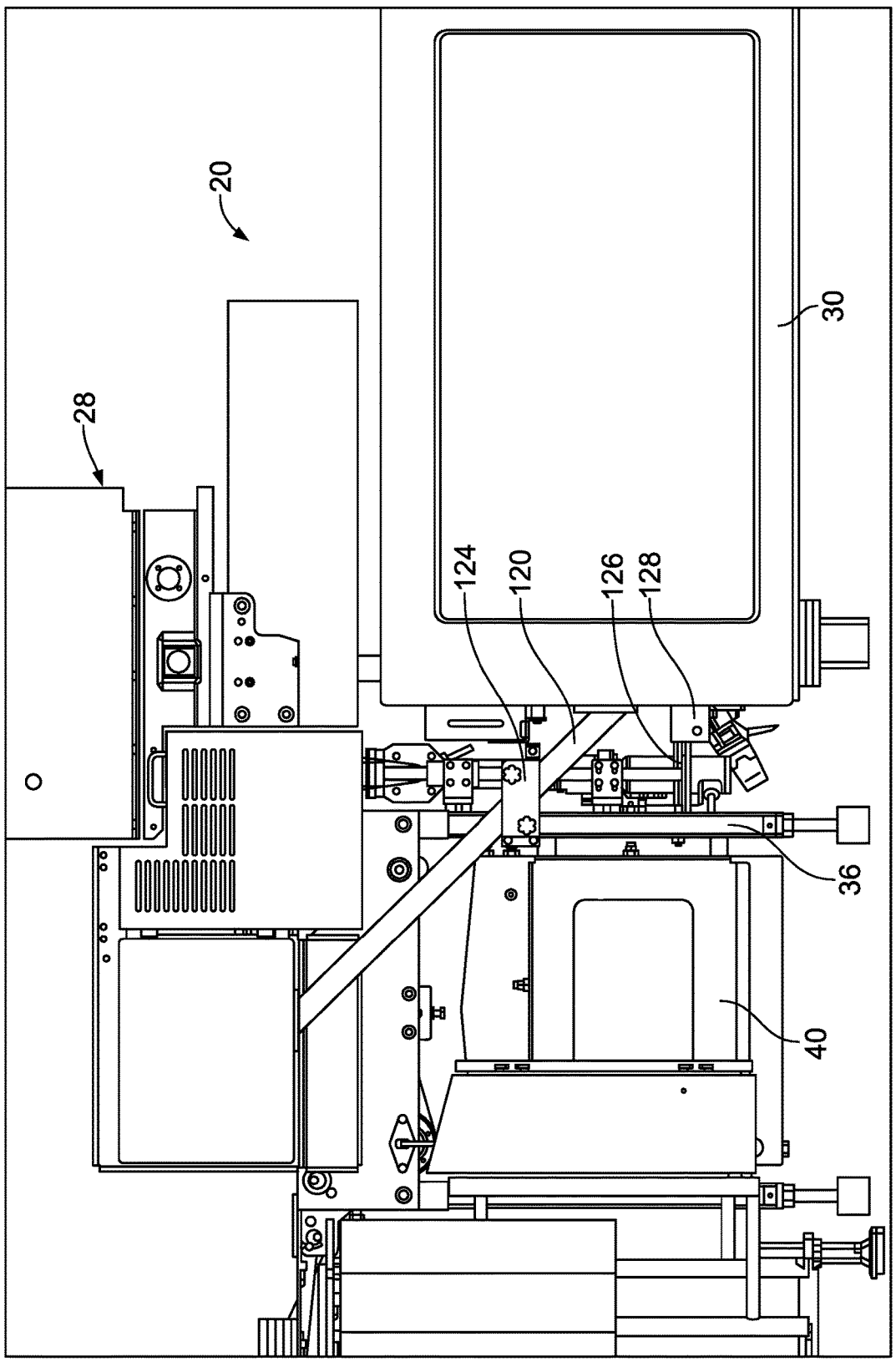
FIG. 18 depicts a partial side elevation view of the patty forming machine.

The frame 32 of the jump shuttle conveyor system 22 further includes a pair of arms 126, see FIGS. 18-20, each of which is pivotally attached to the rear wall 36 and extends outward from the rear wall 36 parallel to the side walls 38, 40. Each arm 126 engages with a cradle 128 on the machine base 30. In an embodiment, each arm 126 has a head 130 which has a cutout 132 therein that mates with a pin 134 in the respective cradle 128.

When the covers 124 are engaged with the clamp plates 122 and the arms 126 are pivoted downwardly to engage the heads 130 from the pins 134, this provides additional stability to the jump shuttle conveyor system 22.

To disengage the jump shuttle conveyor system 22 from the machine base 30, the covers 124 are removed from the clamp plates 122 and the arms 126 are pivoted upwardly to disengage the heads 130 from the pins 134. Therefore, the jump shuttle conveyor system 22 is pulled outwardly from the machine base 30. This allows the jump shuttle conveyor system 22 to be easily cleaned.

The transfer shuttle conveyor system 24 is best shown in FIGS. 21-30. The transfer shuttle conveyor system 24 includes a pair of vertical frame side walls 150, 152 which extend upward from the respective side walls 38, 40 of the frame 32, a first horizontal pan 154 affixed between the frame side walls 150, 152, a second horizontal pan 156 attached between the frame side walls 150, 152 by a pan moving assembly 158, a third horizontal pan 160 attached to the frame side walls 150, 152 by the pan moving assembly 158, a plurality of rollers 162, 164, 166, 168, 170, 172, and a belt 174 which is woven with the rollers 162, 164, 166, 168, 170, 172 and forms a continuous loop. The second and third pans 156, 160 are movable relative to the frame side walls 150, 152 and relative to the first pan 154 such that the transfer shuttle conveyor system 24 can move between an extended position and a retracted position. During retraction and extension, the upper surfaces of the pans 154, 156, 160 are horizontally aligned with each other and in the same plane. In an embodiment, each pan 154, 156, 160 is formed of metal. FIGS. 21-26 show the transfer shuttle conveyor system 24 in the extended position. FIGS. 27-30 show the transfer shuttle conveyor system 24 in the retracted position.

Figure 23:
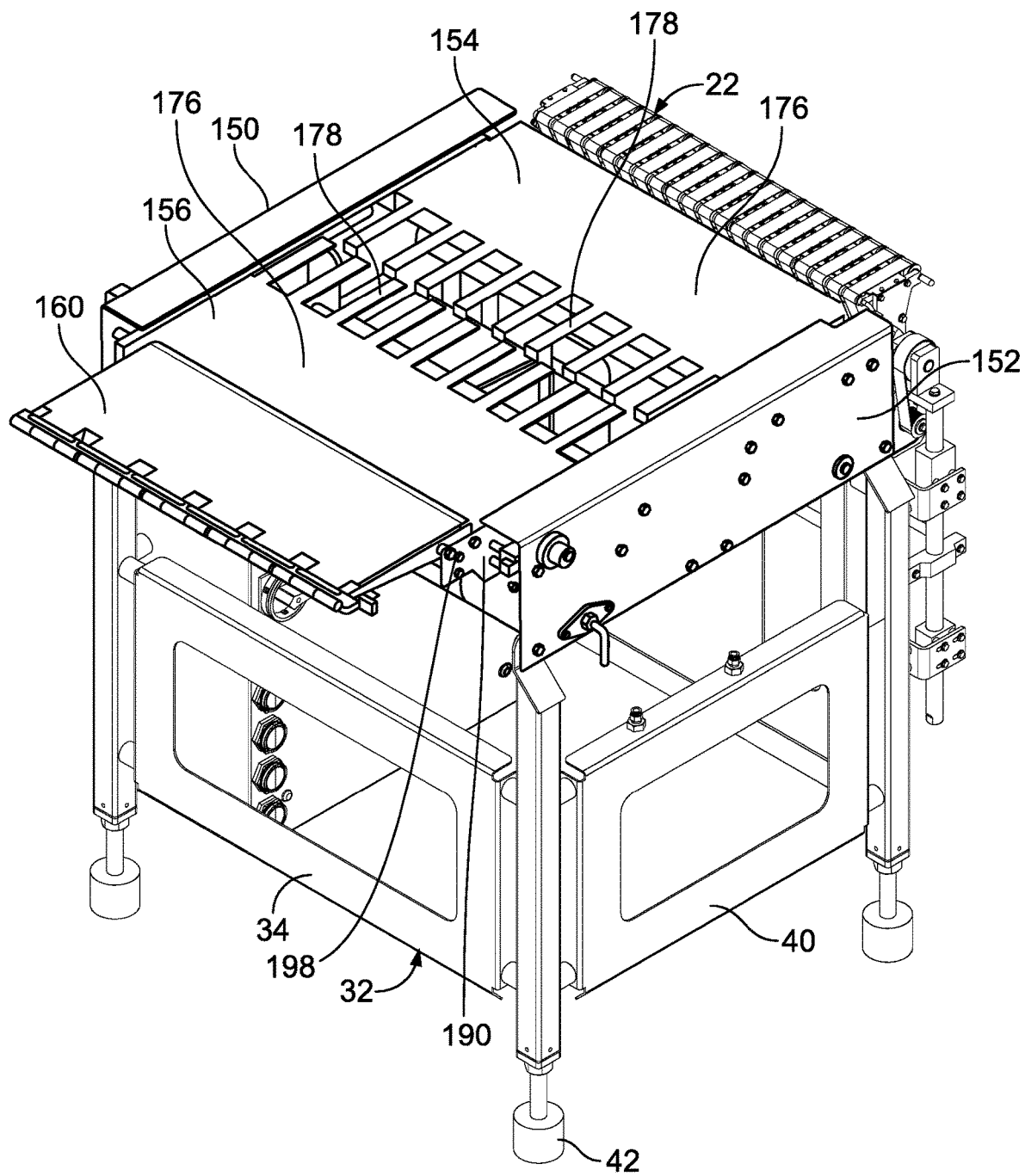
FIGS. 23 and 24 depict front perspective views of the transfer shuttle conveyor system in the extended position, with components removed to show the internal structure.
Figure 24:
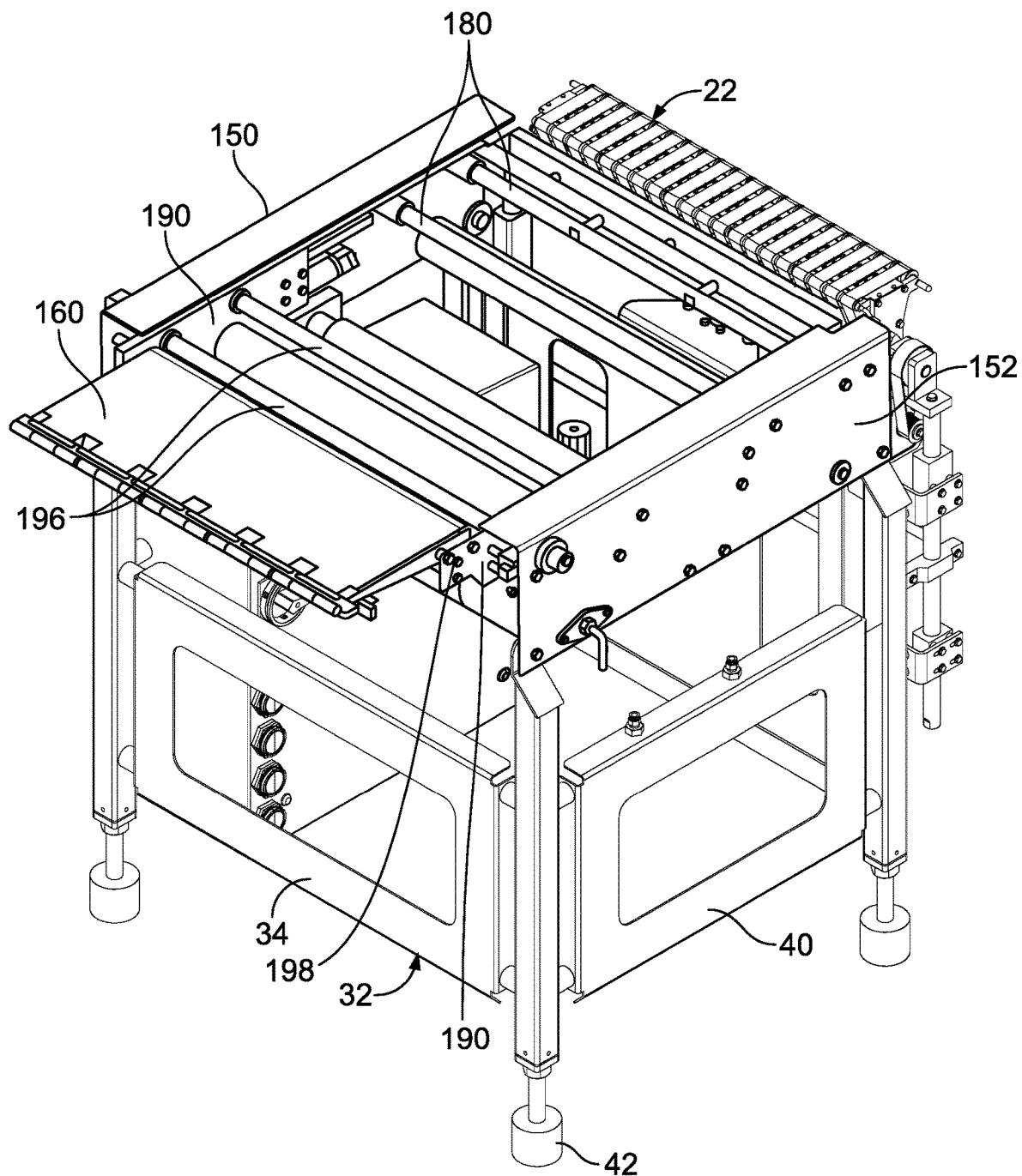
Figure 28:
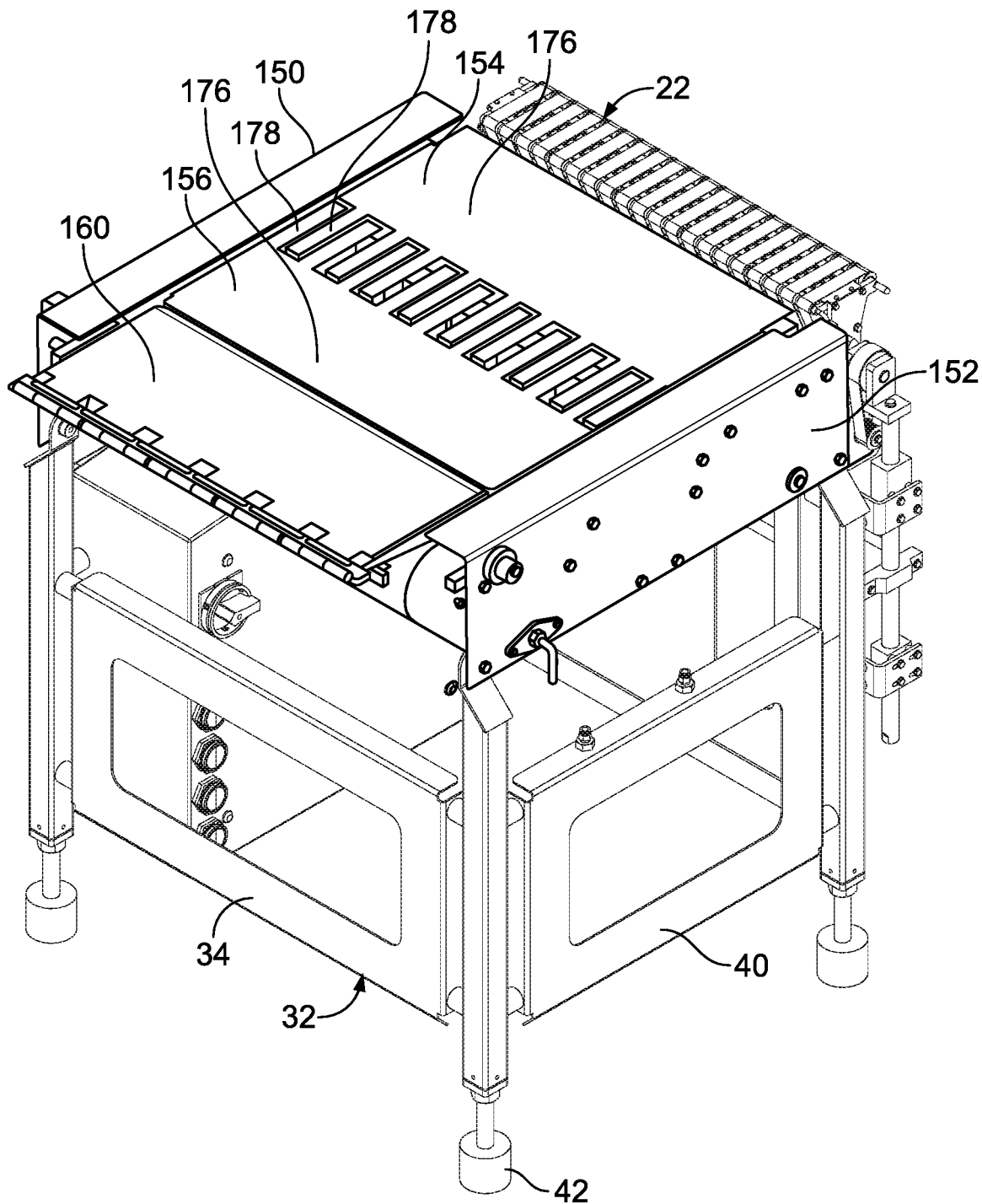
FIG. 28 depicts a front perspective view of the transfer shuttle conveyor system in the retracted position, with components removed to show the internal structure.

Each of the first and second pans 154, 156 have a planar section 176 with a plurality of spaced apart fingers 178 extending therefrom. When the transfer shuttle conveyor system 24 is in the extended position, the fingers 178 on the pans 154, 156 are separated from each other as shown in FIG. 23. When the transfer shuttle conveyor system 24 is in the retracted position, the fingers 178 on the pans 154, 156 are intermeshed such that a solid surface or a substantially solid surface is formed as shown in FIG. 28. As such, the first pan 154 has the fingers 178 at the downstream end, and the second pan 156 has the fingers at the upstream end.

In an embodiment, the first pan 154 seats on a pair of support rods 180 which are connected to the frame side walls 150, 152. The first pan 154 is stationary relative to the frame side walls 150, 152.

Figure 25:
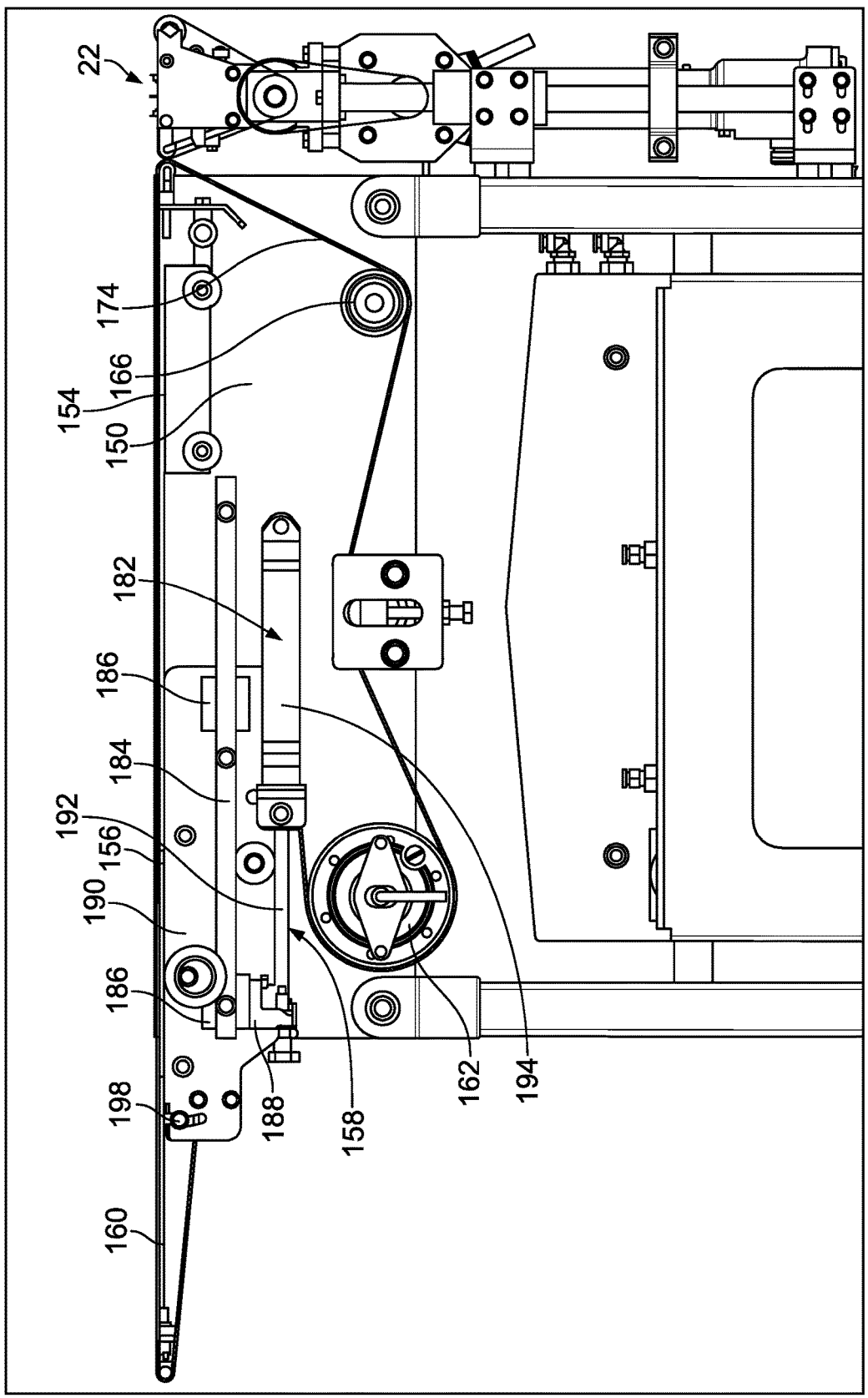
FIGS. 25 and 26 depict cross-sectional views of the transfer shuttle conveyor system in the extended position.
Figure 26:
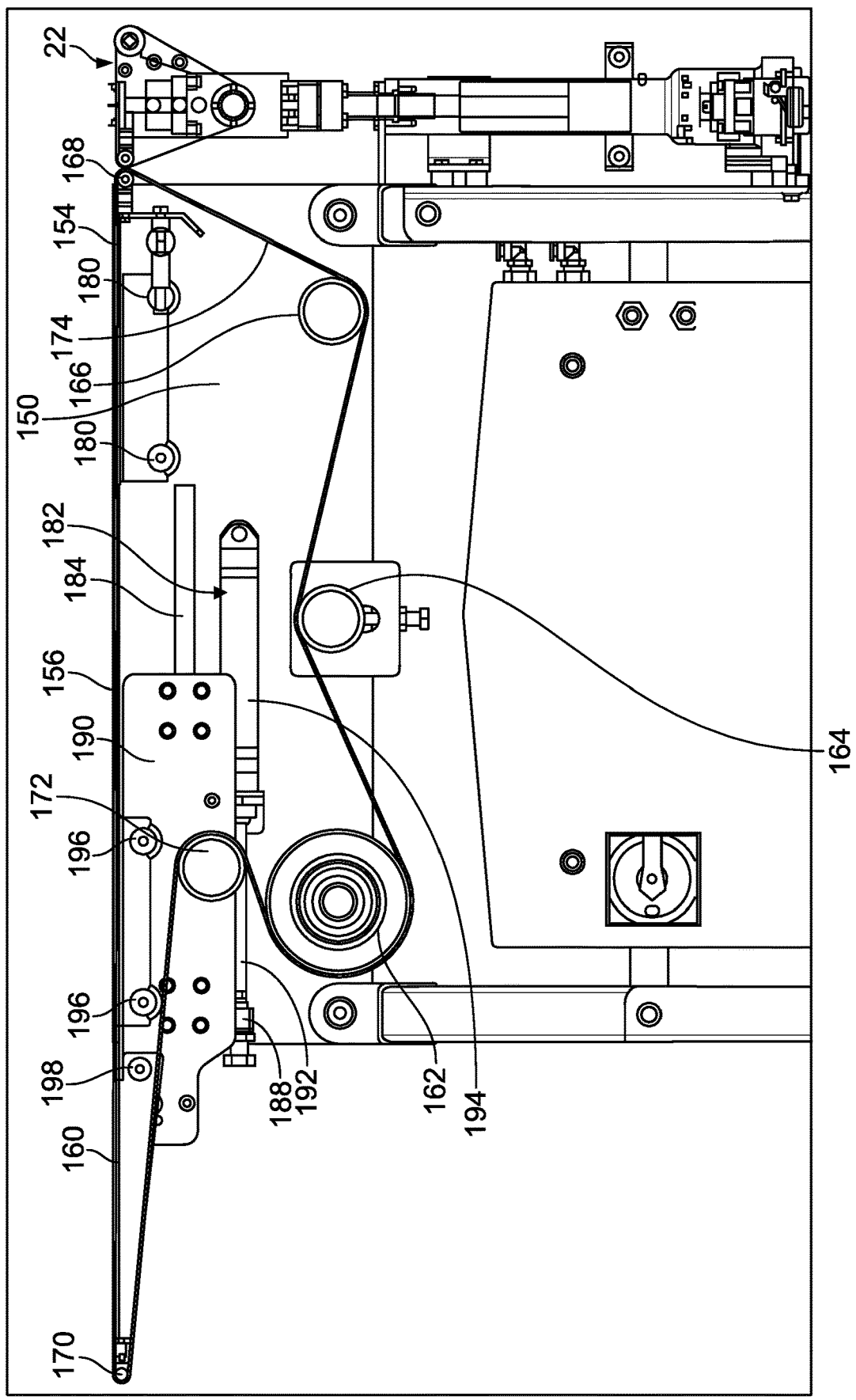
Figure 27:
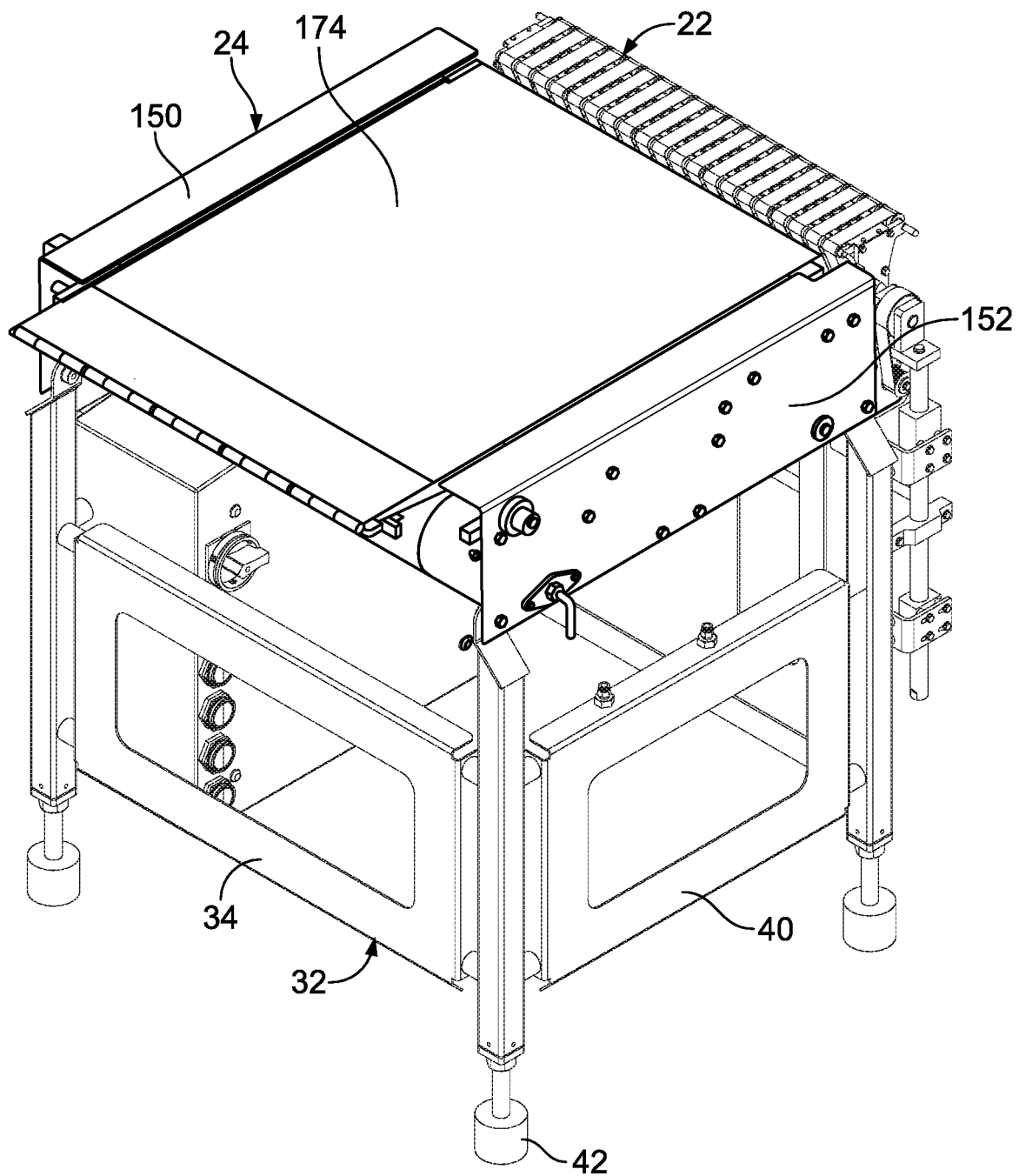
FIG. 27 depicts a front perspective view of the transfer shuttle conveyor system in a retracted position.
Figure 29:
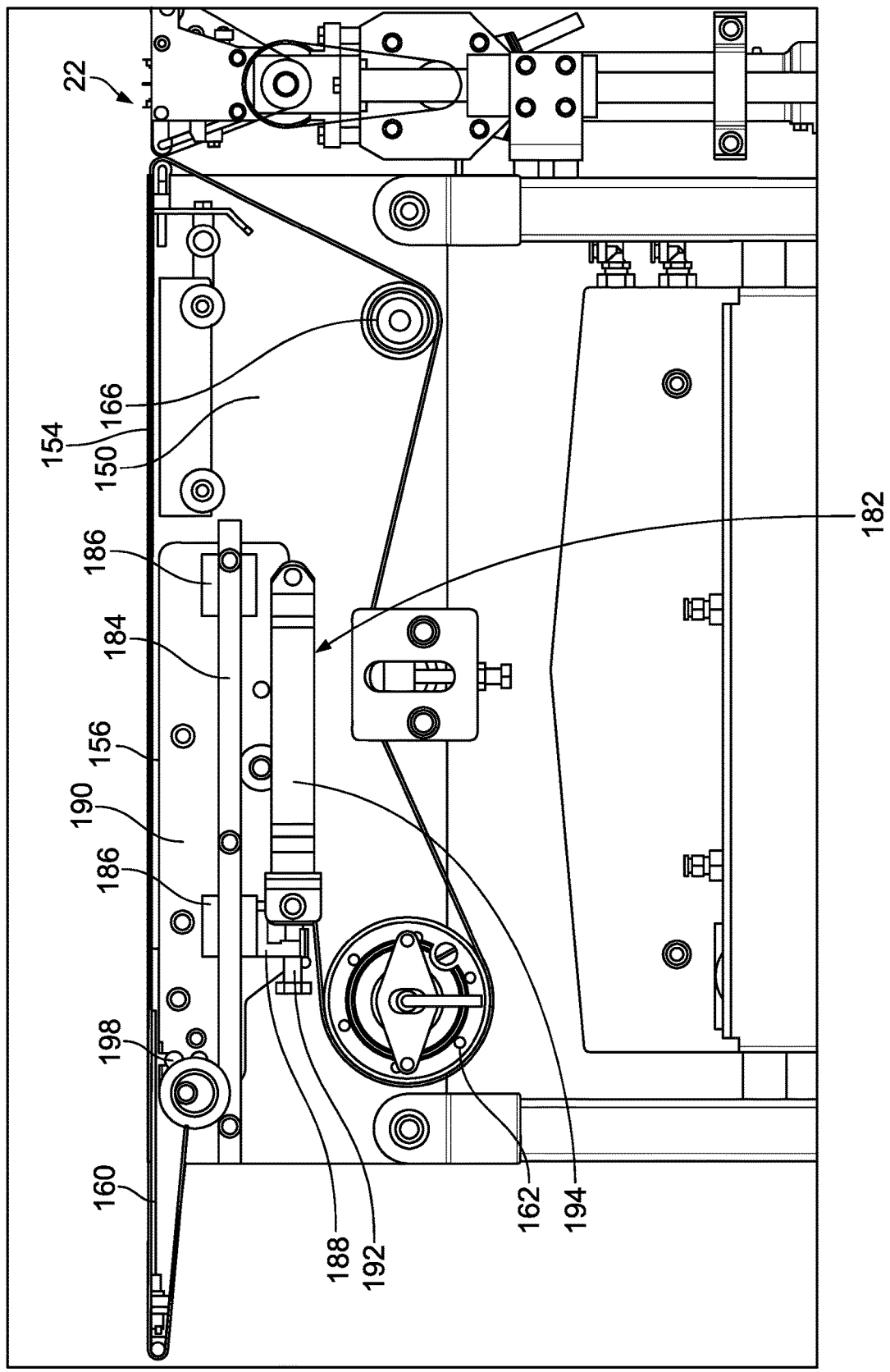
FIGS. 29 and 30 depict cross-sectional views of the transfer shuttle conveyor system in the retracted position.
Figure 30:
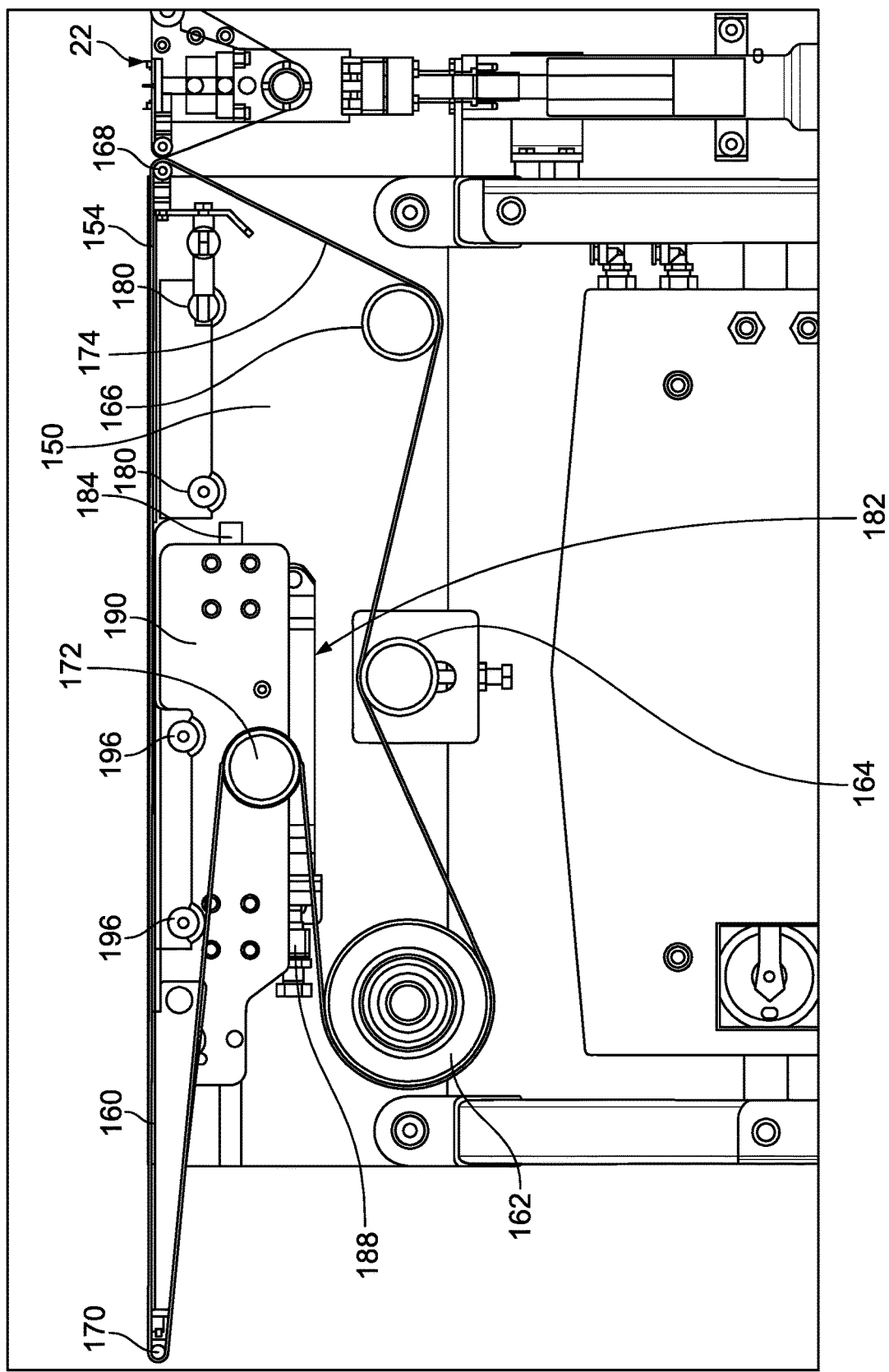

The pan moving assembly 158 includes an actuator 182 attached to an inner surface of each frame side wall 150, 152 (FIGS. 25 and 29 shows frame side wall 152 removed and FIGS. 26 and 30 show cross-sectional views), a horizontal rail 184 attached to the inner surface of each frame side wall 150, 152, a pair of spaced apart bearing blocks 186 slidably seated on each rail 184, a connector 188 which affixes one of the bearing blocks 186 to the respective actuator 182, and a vertical carriage plate 190 affixed to the respective sets of bearing blocks 186. In an embodiment, the rails 184 are above the actuators 182. One carriage plate 190 is proximate to and parallel to the vertical portion of frame side wall 150 and the other carriage plate 190 is proximate to and parallel to the vertical portion of frame side wall 152. Each actuator 182 may be a piston rod 192 housed within a cylinder 194 and may be air actuated.

The second pan 156 seats on a pair of support rods 196 which extend between and are connected to the carriage plates 190. The second pan 156 and support rods 196 move with the carriage plates 190 as described herein such that the second pan 156 is stationary relative to the carriage plates 190 during retraction and extension.

The third pan 160 is cantilevered from a front end of the carriage plates 190 and is pivotally attached to the carriage plates 190 at pivot 198, see FIGS. 25 and 29. The third pan 160 is stationary relative to the carriage plates 190 and relative to the second pan 156 during retraction and extension.

Roller 162 is a driven drive roller and is mounted between the frame side walls 150, 152. The drive roller 162 is rotated by a motor (not shown). The drive roller 162 is below the actuator 182. Roller 164 is a first idler roller and is attached between the frame side walls 150, 152 and is rearward of the drive roller 162. Roller 166 is a second idler roller and is attached between the frame side walls 150, 152 and is rearward of the first idler roller 164. The rotational axes of the drive roller 162, the first idler roller 164 and the second idler roller 166 are vertically aligned with each other. Roller 168 is a third idler roller and is provided at the rear end of the first pan 154 (the end closest to the jump shuttle conveyor system 22) and is rotatable relative to the first pan 154. Idler roller 168 is rearward of idler roller 166. Roller 170 is a fourth idler roller and is provided at the front end of the third pan 160 (the end farthest away from the second pan 156) and is rotatable relative to the third pan 160. Idler roller 170 is forward of drive roller 162. The third and fourth idler rollers 168, 170 are vertically aligned with each other. Roller 172 is a fifth idler roller and is attached between the carriage plates 190 and moves with the carriage plates 190 as described herein. The fifth idler roller 172 is above drive roller 162. The drive roller 162 and the first, second and third rollers 164, 166, 168 always maintain the same spacing relative to each other. The fourth and fifth idler rollers 170, 172 always maintain the same spacing relative to each other.

The belt 174 is wound around the drive roller 162 and the idler rollers 164, 166, 168, 170, 172 to form a continuous loop. The belt 174 extends partially around the outer perimeter of the drive roller 162, loops over the first idler roller 164, loops under the second idler roller 166, extends partially around the outer perimeter of the third idler roller 168 and extends along the lengths of the pans 154, 156, 160, extends partially around the outer perimeter of the fourth idler roller 170, loops over the fifth idler roller 172 to the drive roller 162. The belt 174 is frictionally engaged with the drive roller 162. When the drive roller 162 is actuated, the belt 174 rotates with the drive roller 162 and rotates around the idler rollers 164, 166, 168, 170, 172, thereby moving the belt 174 relative to the pans 154, 156, 160.

The transfer shuttle conveyor system 24 is in the extended position when the columns of food patties are received onto the belt 174 from the jump shuttle conveyor system 22. Once the columns of food patties are on the belt 174, the drive roller 162 is actuated to move the belt 174 and the columns of food patties along the length of the belt 174 such that the columns of food patties move from proximate to the rear end of the first pan 154 to proximate to the front end of the third pan 160.

The output conveyor system 26 has a first conveyor belt 200 which positioned underneath the third pan 160 when the transfer shuttle conveyor system 24 is in the extended position and has a second conveyor belt 202 which is at an angle relative to the first conveyor belt 200, a stop bar 204 mounted on the first conveyor belt 200 and which extends vertically upwardly from the first conveyor belt 200, and a photo eye sensor 206 attached to the stop bar 204. The sensor 206 senses when the food patties (or the paper interleaved between the food patties) are within the range of the sensor 206 and thus are proximate to the stop bar 204. When the sensor 206 senses when the food patties (or the paper interleaved between the food patties) are within its range, a signal is sent to the transfer shuttle conveyor system 24 to retract.

To retract the transfer shuttle conveyor system 24, the actuators 182 are actuated thereby retracting the rod 192 into the cylinder 194, which causes the second and third pans 156, 160, the support rods 196, the fourth and fifth idler rollers 170, 172, the carriage plates 190 and the bearing blocks 186 to move toward the first pan 154 and relative to the frame side walls 150, 152. Thus, the spacing of the fourth and fifth idler rollers 170, 172 relative to the drive roller 162 and the first, second and third idler rollers 164, 166, 168 varies. When the carriage plates 190 move during retraction, the attached fourth and fifth idler rollers 170, 172 move thereby preventing slack in the belt 174. The transfer shuttle conveyor system 24 is retracted quickly such that the columns of food patties are deposited onto the first conveyor belt 200 of the output conveyor system 26. The output conveyor system 26 then transports the columns of food patties to the collection site via the conveyor belts 200, 202.

During retraction and expansion, the second and third pans 156, 160 form a single pan in effect, since the pans 156, 160 do not move relative to each other.

After the columns of food patties are deposited onto the first conveyor belt 200 of the output conveyor system 26, the transfer shuttle conveyor system 24 is extended again the process is repeated for the next set of columns of food patties onto the output conveyor system 26. To extend the transfer shuttle conveyor system 24, the actuators 182 are actuated thereby extending the rod 192 from out of the cylinder 194, the second and third pans 156, 160, the support rods 196, the fourth and fifth idler rollers 170, 172, the carriage plates 190 and the bearing blocks 186 to move away from the first pan 154 and relative to the frame side walls 150, 152. When the carriage plates 190 move during retraction, the attached fourth and fifth idler rollers 170, 172 move thereby preventing slack in the belt 174.

The first and second pans 154, 156 can be removed from the frame side walls 150, 152 for cleaning. To remove the first and second pans 154, 156, the third pan 160 is pivoted upwardly and rearwardly around its pivots 198 to break the tension in the belt 174. Once the tension is broken, the second pan 156 can be lifted off of its support rods 196 and slid sideways out from the loop formed by the belt 174 for cleaning, and then the first pan 154 can be lifted off of its support rods and 180 and slid sideways out from the loop formed by the belt 174 for cleaning. Once serviced, the pans 154, 156 are reseated onto the support rods 180, 196.

Many modifications and other embodiments of the disclosure set forth herein will come to mind to one skilled in the art to which these disclosed embodiments pertain having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

While particular embodiments are illustrated in and described with respect to the drawings, it is envisioned that those skilled in the art may devise various modifications without departing from the spirit and scope of the appended claims. It will therefore be appreciated that the scope of the disclosure and the appended claims is not limited to the specific embodiments illustrated in and discussed with respect to the drawings and that modifications and other embodiments are intended to be included within the scope of the disclosure and appended drawings. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure and the appended claims.

What is claimed is:

1. A jump shuttle conveyor system configured to receive formed food patties from a molding assembly of a patty forming machine, comprising:
   a frame;
   a motor mounted on the frame and configured to extend and retract a vertically extending actuating rod;
   a lifting plate attached to the actuating rod and configured for vertical movement under action of the motor; and
   a belt assembly coupled to the lifting plate, the belt assembly including a belt, a drive shaft and rods around which the belt circulates and forms a continuous loop, the drive shaft and rods being coupled to the lifting plate, the drive shaft and the rods forming a triangular shape,
   wherein the belt assembly is configured for vertical movement with the lifting plate, and the lifting plate and belt assembly are configured to be indexed to different vertical positions relative to the frame for receiving formed food patties thereon.

2. The jump shuttle conveyor system of claim 1, wherein the belt circulates around the drive shaft and rods under action of a second motor connected to the drive shaft.

3. The jump shuttle conveyor system of claim 1, wherein a second motor is coupled to, and drives, a toothed gear, and the drive shaft is coupled to the toothed gear at an end thereof, wherein the end of the drive shaft has a hexagonal shape thereon.

4. The jump shuttle conveyor system of claim 1, wherein a plurality of belts is provided.

5. The jump shuttle conveyor system of claim 4, further comprising a horizontal support plate fixedly coupled to the lifting plate, and wherein the belts engage a top surface of the support plate.

6. A jump shuttle conveyor system configured to receive formed food patties from a molding assembly of a patty forming machine, comprising:
   a frame;
   a motor mounted on the frame and configured to extend and retract a vertically extending actuating rod;
   a lifting plate attached to the actuating rod and configured for vertical movement under action of the motor;
   a horizontal support plate fixedly coupled to the lifting plate;
   a belt assembly coupled to the lifting plate, the belt assembly including a plurality of belts, a drive shaft and rods around which the belts circulate and forms continuous loops, the belts engaging a top surface of the support plate, the drive shaft and rods being coupled to the lifting plate, wherein the belt assembly is configured for vertical movement with the lifting plate, and the lifting plate and belt assembly are configured to be indexed to different vertical positions relative to the frame for receiving formed food patties thereon;

the support plate having a plurality of holes therethrough which align with spaces between the belts; and a horizontal pin plate coupled to the lifting plate, the pin plate having plurality of spaced apart pins extending vertically upward from an upper surface of the pin plate, the pin plate being movable by an actuator to extend the pins through the holes in the support plate or to retract the pins from the holes.

7. The jump shuttle conveyor system of claim 6, wherein the drive shaft and rods form a triangular shape.

8. An assembly comprising:
a frame;
a jump shuttle conveyor system configured to receive formed food patties thereon, including:
  a motor mounted on the frame and configured to extend and retract a vertically extending actuating rod,
  a lifting plate attached to the actuating rod and configured for vertical movement under action of the motor, and
  a belt assembly coupled to the lifting plate, the belt assembly including a belt, a drive shaft and rods around which the belt circulates, the drive shaft and rods being coupled to the lifting plate,
  wherein the belt assembly is configured for vertical movement with the lifting plate, and the lifting plate and belt assembly are configured to be indexed to different vertical positions relative to the frame for receiving formed food patties thereon; and
a transfer shuttle conveyor system including:
  a first horizontal pan mounted on the frame, the first pan having a plurality of spaced apart fingers at a downstream end thereof,
  carriage plates movably coupled to the frame;
  a second horizontal pan mounted on the carriage plates and movable relative to the first pan in a horizontal direction away from the first pan and toward the first horizontal pan, the second pan having a plurality of spaced apart fingers at an upstream end thereof, wherein when the second pan is configured for movement between an extended position in which the fingers on the first and second pans are separated from each other and a retracted position in which the fingers on the first and second pans are intermeshed with each other; and
  a driven drive shaft coupled to the frame,
  a plurality of rollers coupled to the frame,
  a plurality of rollers coupled to the carriage plates and movable with the carriage plates, and
  a belt looping through the rollers coupled to the frame and through the rollers coupled to the carriage plates to form a continuous loop.

9. The assembly of claim 8, wherein the belt of the jump shuttle conveyor system circulates around the drive shaft and rods of the jump shuttle conveyor system under action of a second motor connected to the drive shaft of the jump shuttle conveyor system, and the belt of the transfer shuttle conveyor circulates around the drive shaft and rods of the transfer shuttle conveyor under action of a third motor connected to the drive shaft of the transfer shuttle conveyor.

10. The assembly of claim 9, wherein a second motor is coupled to, and drives, a toothed gear, and the drive shaft is coupled to the toothed gear at an end thereof, wherein the end of the drive shaft has a hexagonal shape thereon.

11. The assembly of claim 8, wherein a plurality of belts is provided in the jump shuttle conveyor system.

12. The assembly of claim 8, further comprising:
a machine base having a molding assembly cantilevered over the jump shuttle conveyor system;
a pair of angled bars extending between the molding assembly and a remainder of the machine base, wherein the jump shuttle conveyor system is positioned between the angled bars;
clamp plates extending from the frame and engaged with the angled bars; and
a cover attached to each clamp plate to sandwich the angled bars between the respective clamp plate and cover.

13. The assembly of claim 12, further comprising:
a pair of arms pivotally attached to the frame, each arm having a head thereon; and
a pair of cradles on the machine base, each cradle having a pin therein,
wherein when the heads mate with the cradles when the arms are pivoted to a first position, and the heads are disengaged from the cradles when the arms are pivoted to a second position.

14. The assembly of claim 13, wherein a cutout in each head is mateable with a pin in each cradle when the arms are pivoted to the first position.

15. The assembly of claim 14, further comprising:
a pair of arms pivotally attached to the frame, each arm having a head thereon; and
a pair of cradles on the machine base, each cradle having a pin therein,
wherein when the heads mate with the cradles when the arms are pivoted to a first position, and the heads are disengaged from the cradles when the arms are pivoted to a second position.

16. The assembly of claim 8, further comprising a third pan pivotally mounted on the carriage plates and pivotable relative to the second pan, the third pan moving with the second pan to the extended and retracted positions; a third pan roller coupled to the third pan and rotatable relative thereto, the belt additionally looping around the third pan roller to form the continuous loop.

17. The assembly of claim 8, further comprising an output conveyor system positioned underneath the transfer shuttle conveyor system when the transfer shuttle conveyor system is in the extended position.

18. The assembly of claim 17, wherein the output conveyor system comprises a first conveyor belt which is positioned underneath the transfer shuttle conveyor system when the transfer shuttle conveyor system is in the extended position, and a second conveyor belt which is at an angle relative to the first conveyor belt.

19. The assembly of claim 17, wherein the output conveyor system comprises a conveyor belt, a stop bar mounted on the conveyor belt and extending vertically upwardly from the conveyor belt, and a photo eye sensor attached to the stop bar.

20. An assembly comprising:
a frame;
a jump shuttle conveyor system configured to receive formed food patties thereon, including:
  a motor mounted on the frame and configured to extend and retract a vertically extending actuating rod, a lifting plate attached to the actuating rod and configured for vertical movement under action of the motor, and a belt assembly coupled to the lifting plate, the belt assembly including a belt, a drive shaft and rods around which the belt circulates, the drive shaft and rods being coupled to the lifting plate, and wherein the lifting plate and the belt assembly are configured to be indexed to different vertical positions relative to the frame for receiving formed food patties thereon;

a machine base having a molding assembly cantilevered over the jump shuttle conveyor system;

a pair of angled bars extending between the molding assembly and a remainder of the machine base, wherein the jump shuttle conveyor system is positioned between the angled bars;

clamp plates extending from the frame and engaged with the angled bars;

a cover attached to each clamp plate to sandwich the angled bars between the respective clamp plate and cover;

a pair of arms pivotally attached to the frame, each arm having a head thereon; and a pair of cradles on the machine base, each cradle having a pin therein, wherein when the heads mate with the cradles when the arms are pivoted to a first position, and the heads are disengaged from the cradles when the arms are pivoted to a second position.

\* \* \* \* \*